US008897195B2

(12) United States Patent
Shimizu

(10) Patent No.: US 8,897,195 B2
(45) Date of Patent: Nov. 25, 2014

(54) MULTICAST DATA COMMUNICATION METHOD AND COMMUNICATION SYSTEM

(75) Inventor: Masatsugu Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 647 days.

(21) Appl. No.: 13/231,435

(22) Filed: Sep. 13, 2011

(65) Prior Publication Data

US 2012/0002584 A1 Jan. 5, 2012

Related U.S. Application Data

(63) Continuation of application No. PCT/JP2009/001422, filed on Mar. 27, 2009.

(51) Int. Cl.
| H04H 20/71 | (2008.01) |
| H04J 3/26 | (2006.01) |
| H04J 1/00 | (2006.01) |
| H04W 36/02 | (2009.01) |
| H04W 4/06 | (2009.01) |

(52) U.S. Cl.
CPC .............. *H04W 36/026* (2013.01); *H04W 4/06* (2013.01)
USPC ........... 370/312; 370/208; 370/281; 370/295; 370/328; 370/432; 370/473; 370/480

(58) Field of Classification Search
USPC ......... 370/208, 281, 295, 312, 319, 328, 343, 370/344, 432, 473, 474, 480, 482
See application file for complete search history.

(56) References Cited

U.S. PATENT DOCUMENTS

| 6,353,637 | B1 | 3/2002 | Mansour et al. |
| 6,430,401 | B1 | 8/2002 | Lou et al. |
| 2003/0009576 | A1 | 1/2003 | Apostolopoulos et al. |
| 2005/0053119 | A1* | 3/2005 | Day .............................. 375/130 |

(Continued)

FOREIGN PATENT DOCUMENTS

| CA | 2 300 579 | 9/2000 |
| CA | 2 302 608 | 9/2000 |

(Continued)

OTHER PUBLICATIONS

International Search Report issued for corresponding International Patent Application No. PCT/JP2009/001422, mailed Jun. 9, 2009.

(Continued)

*Primary Examiner* — Benjamin H Elliott, IV
(74) *Attorney, Agent, or Firm* — Myers Wolin, LLC

(57) ABSTRACT

An MBMS-GW delivers multicast data from a contents management server respectively to base stations, partitions and codes the multicast data into a plurality of pieces of multiple description code data, and delivers the plurality of pieces of MD-code data respectively to the base stations. Each of the base stations arbitrarily sets a plurality of transmission carrier frequencies for respectively transmitting the plurality of pieces of MD code data, and concurrently transmits the plurality of pieces of MD code data delivered from the MBMS-GW by respectively using the plurality of transmission carrier frequencies set by the transmission frequency setting unit. An LTE terminal or an LTE-A terminal receives, from a corresponding base station, any one or more of the plurality of pieces of MD code data transmitted by using the plurality of transmission carrier frequencies, and decodes and reproduces the multicast data from the received MD-code data.

8 Claims, 26 Drawing Sheets

(56) References Cited

U.S. PATENT DOCUMENTS

| | | | |
|---|---|---|---|
| 2006/0015792 A1* | 1/2006 | Vitali et al. | 714/758 |
| 2006/0233275 A1 | 10/2006 | Chen et al. | |
| 2008/0200178 A1 | 8/2008 | Hamabe | |
| 2009/0005109 A1 | 1/2009 | Nishio et al. | |
| 2010/0296428 A1* | 11/2010 | Ho | 370/312 |
| 2012/0002584 A1* | 1/2012 | Shimizu | 370/312 |

FOREIGN PATENT DOCUMENTS

| | | |
|---|---|---|
| EP | 1 041 756 | 10/2000 |
| EP | 1 041 766 | 10/2000 |
| EP | 1 760 907 | 3/2007 |
| GB | 2208985 | 4/1989 |
| GB | 2 446 933 | 8/2008 |
| JP | 2000-341247 | 12/2000 |
| JP | 2005-508584 | 3/2005 |
| JP | 2008-205869 | 9/2008 |
| WO | 2006/011347 | 2/2006 |

OTHER PUBLICATIONS

Notice of Rejection Grounds (Office Action) issued for corresponding Japanese Patent Application No. 2011-505674, mailed Feb. 5, 2013 with an English translation.

Extended European search report issued for corresponding European Patent Application No. 09842163.9 dated Jun. 27, 2012.

* cited by examiner

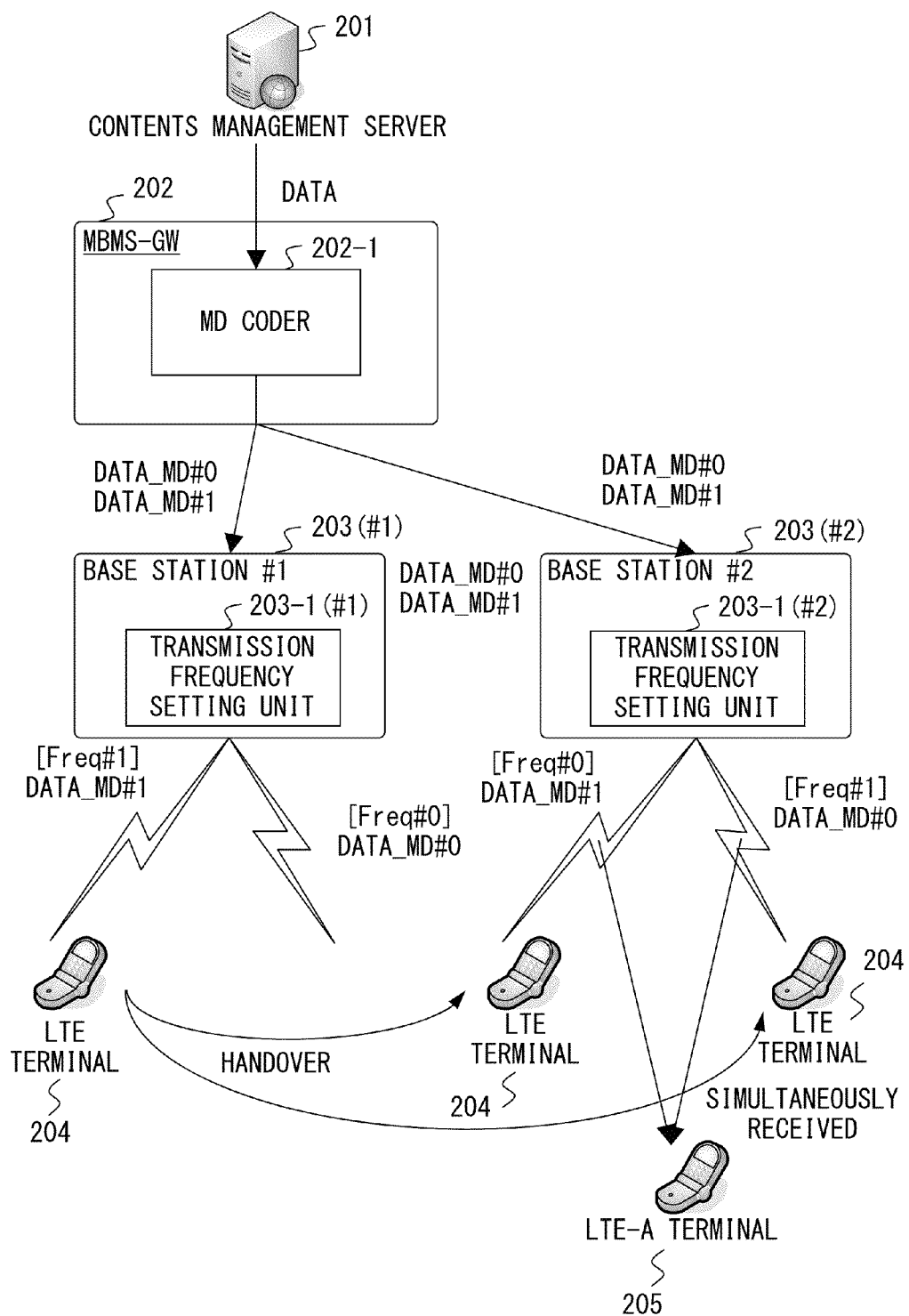
F I G. 2

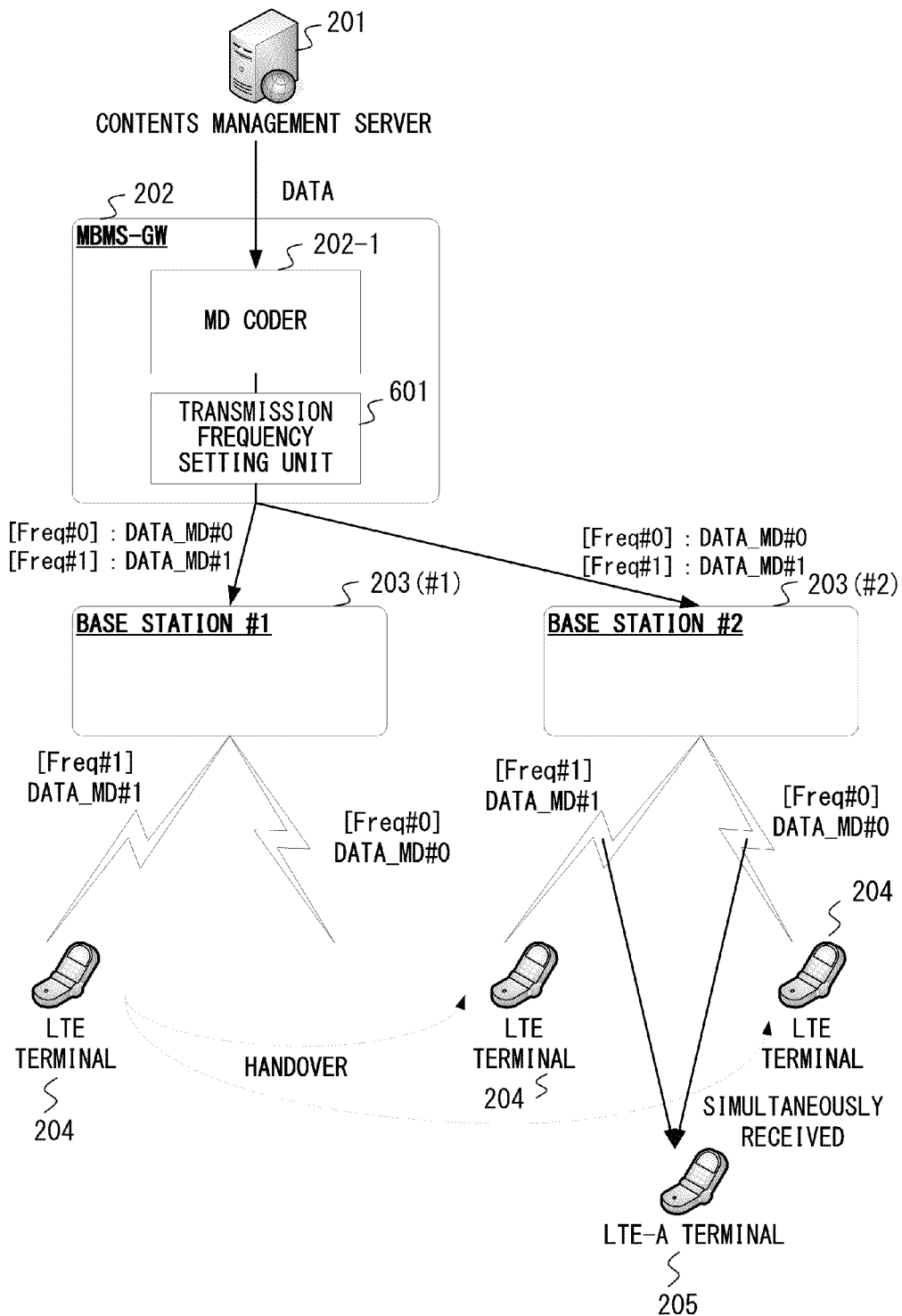
F I G. 6

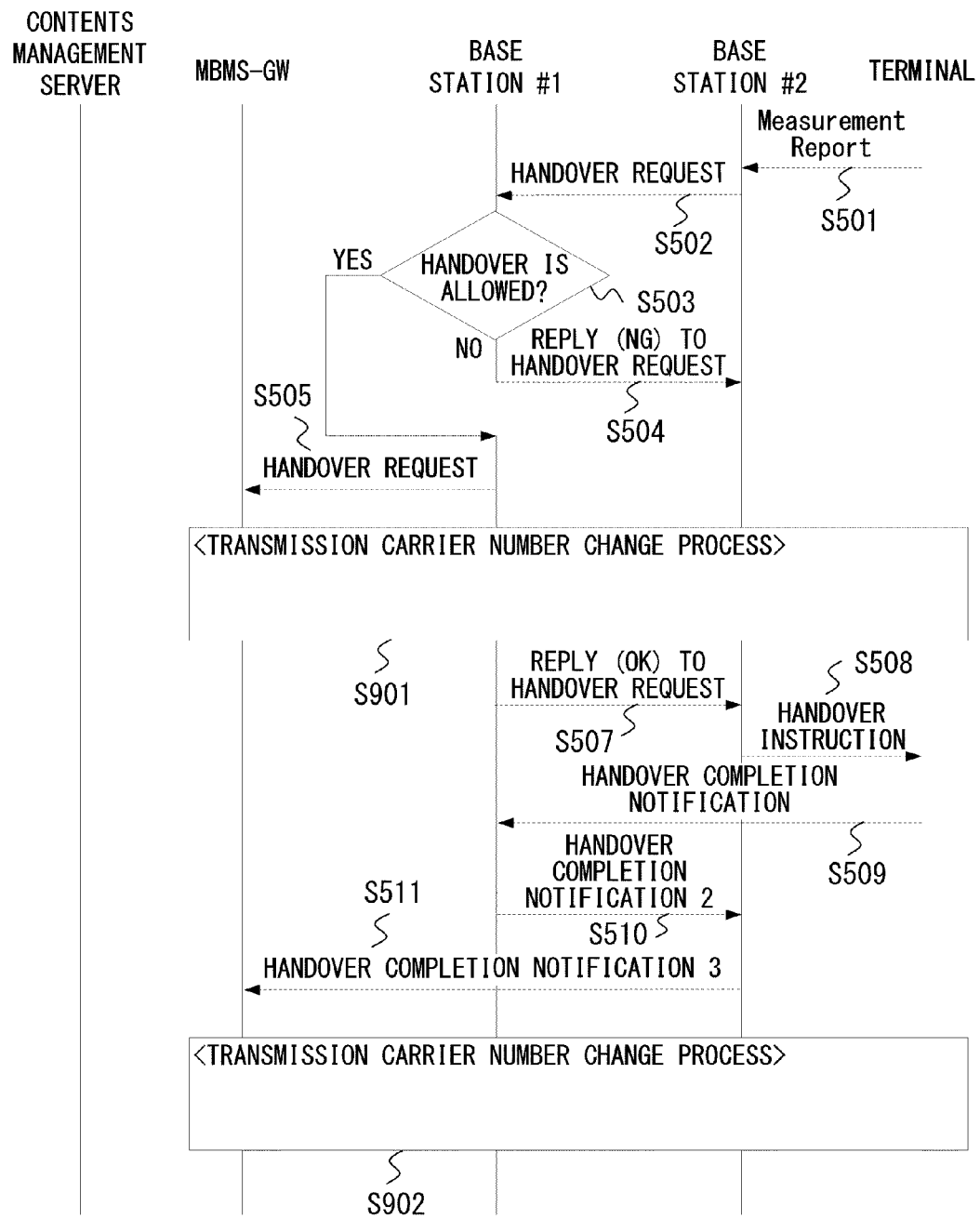
F I G. 9

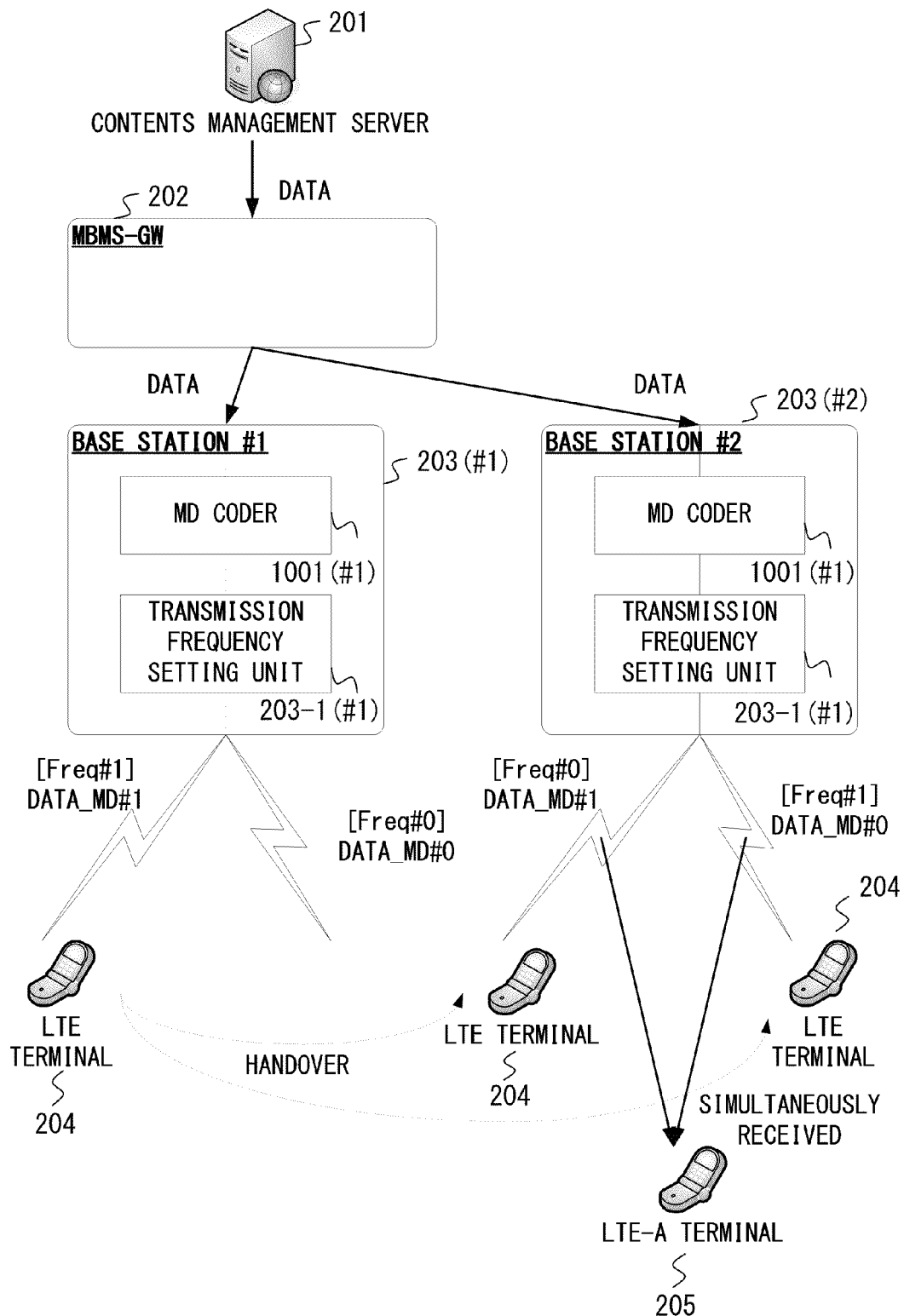
F I G. 1 0

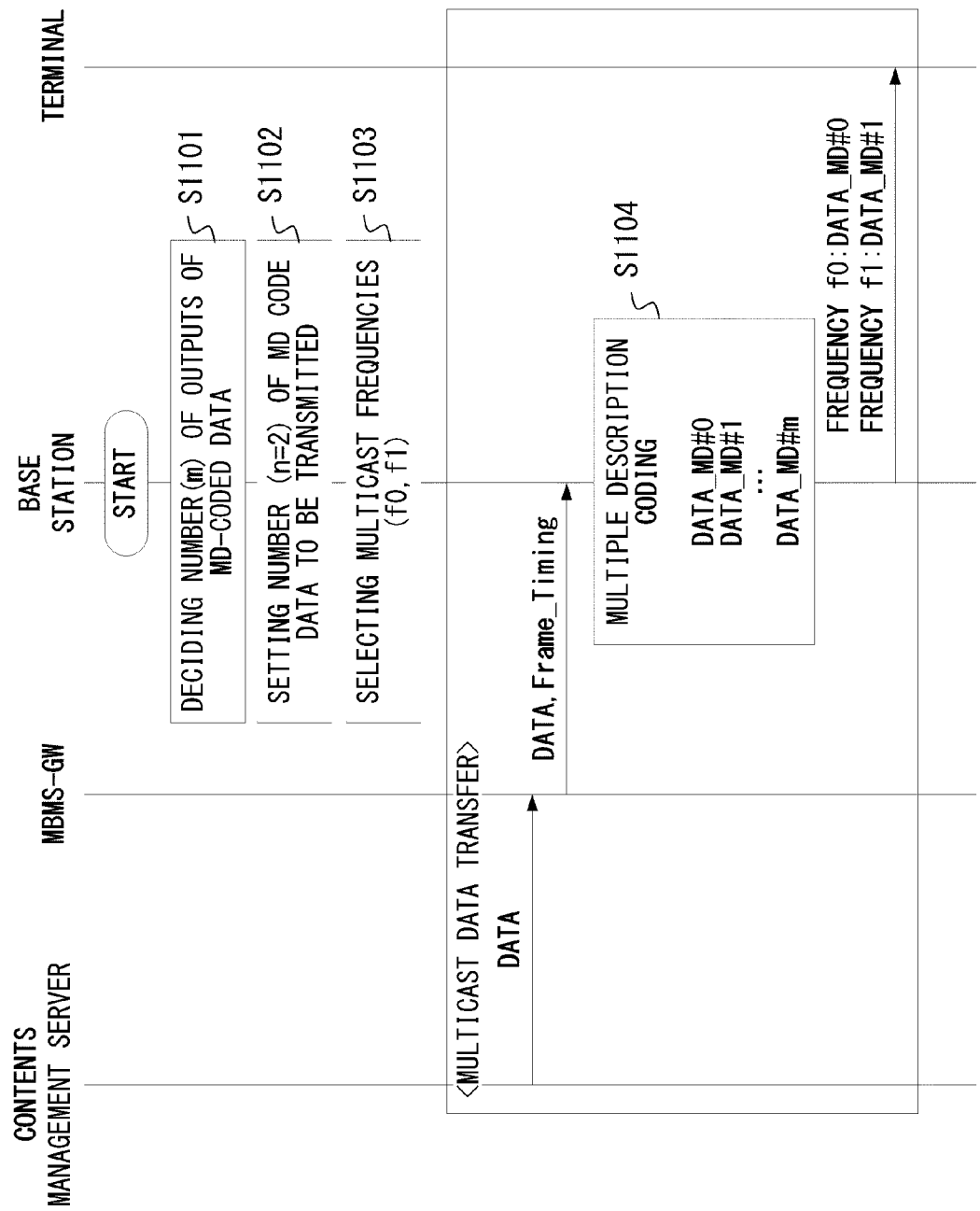
F I G. 1 1

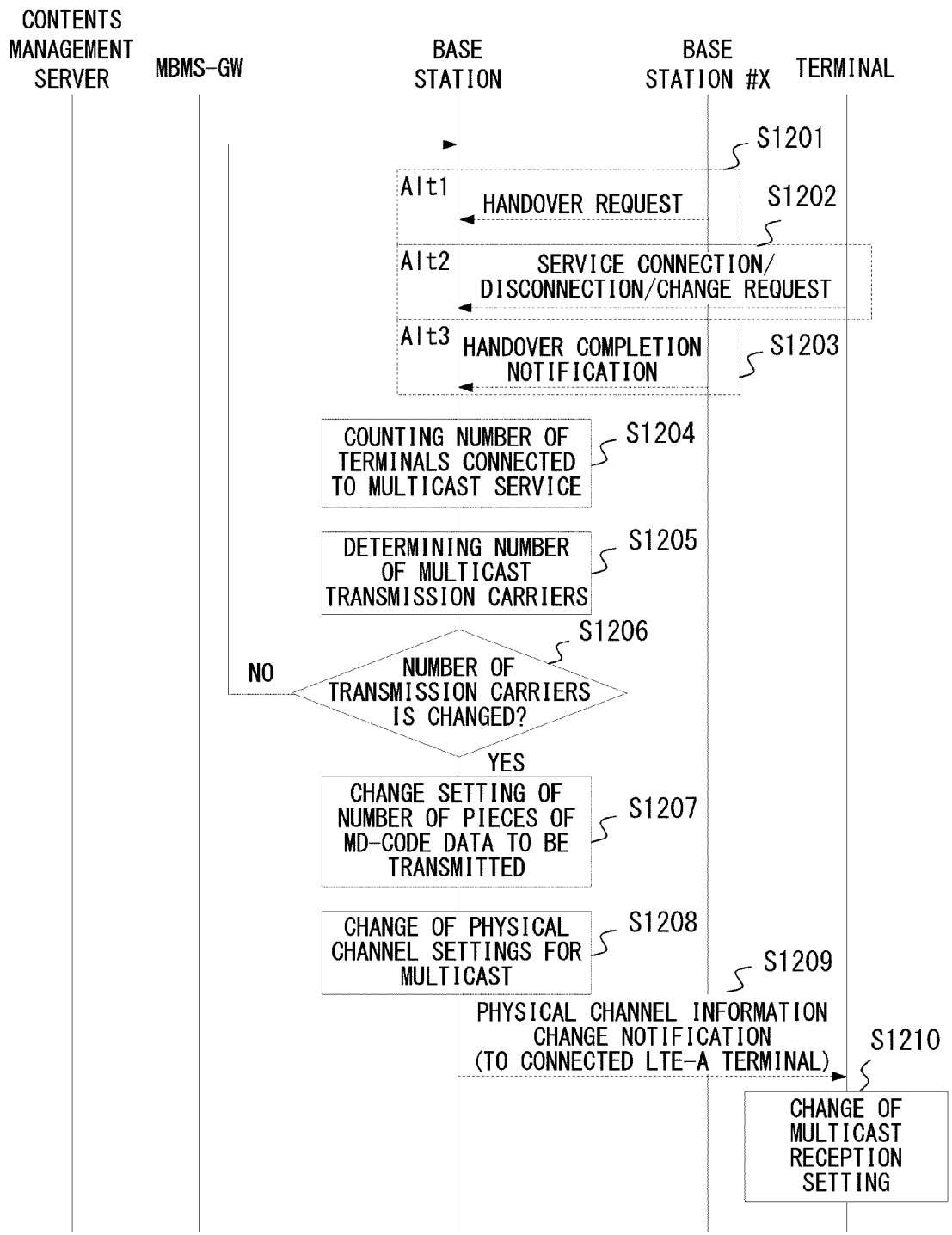
F I G. 1 2

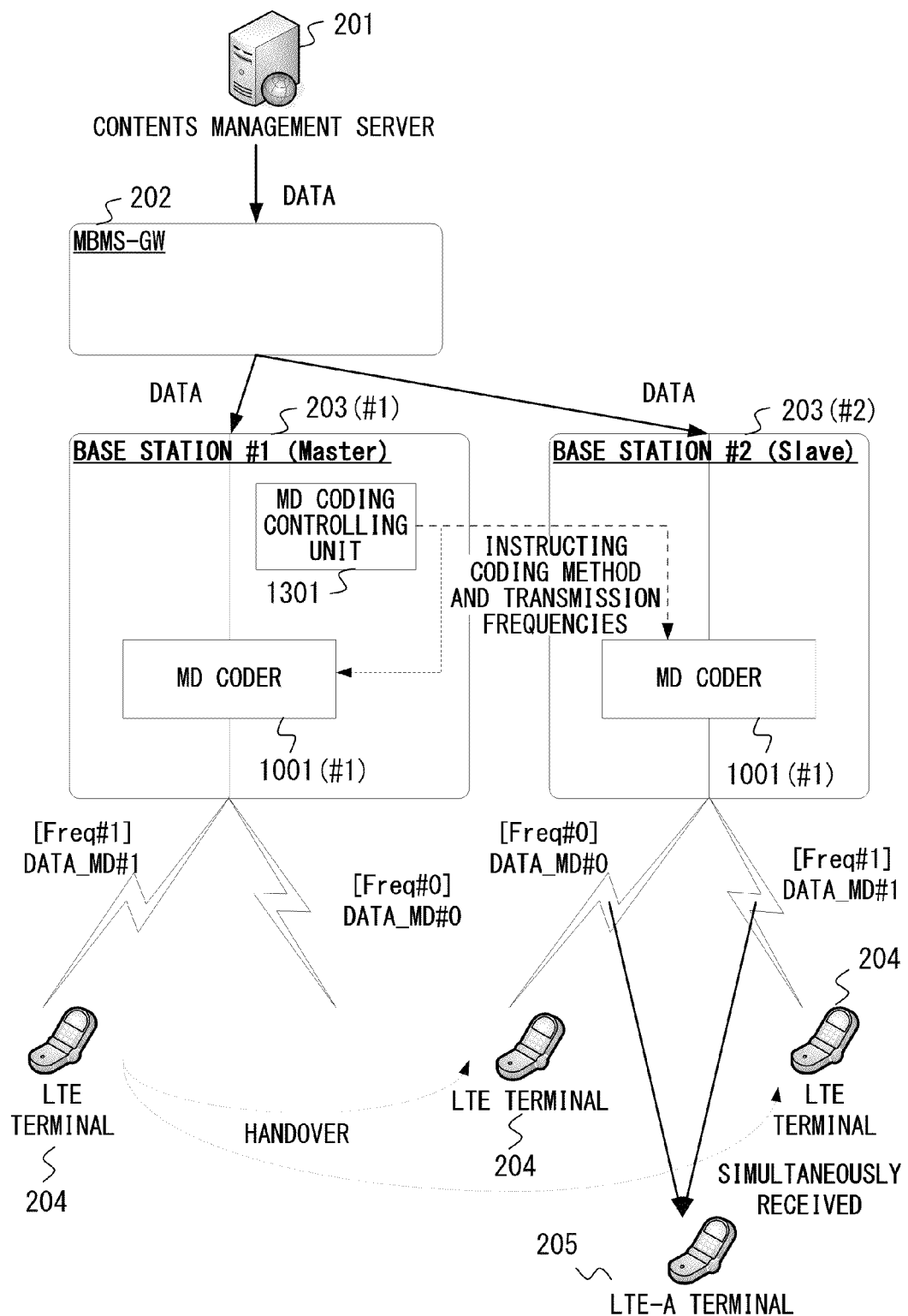
F I G. 1 3

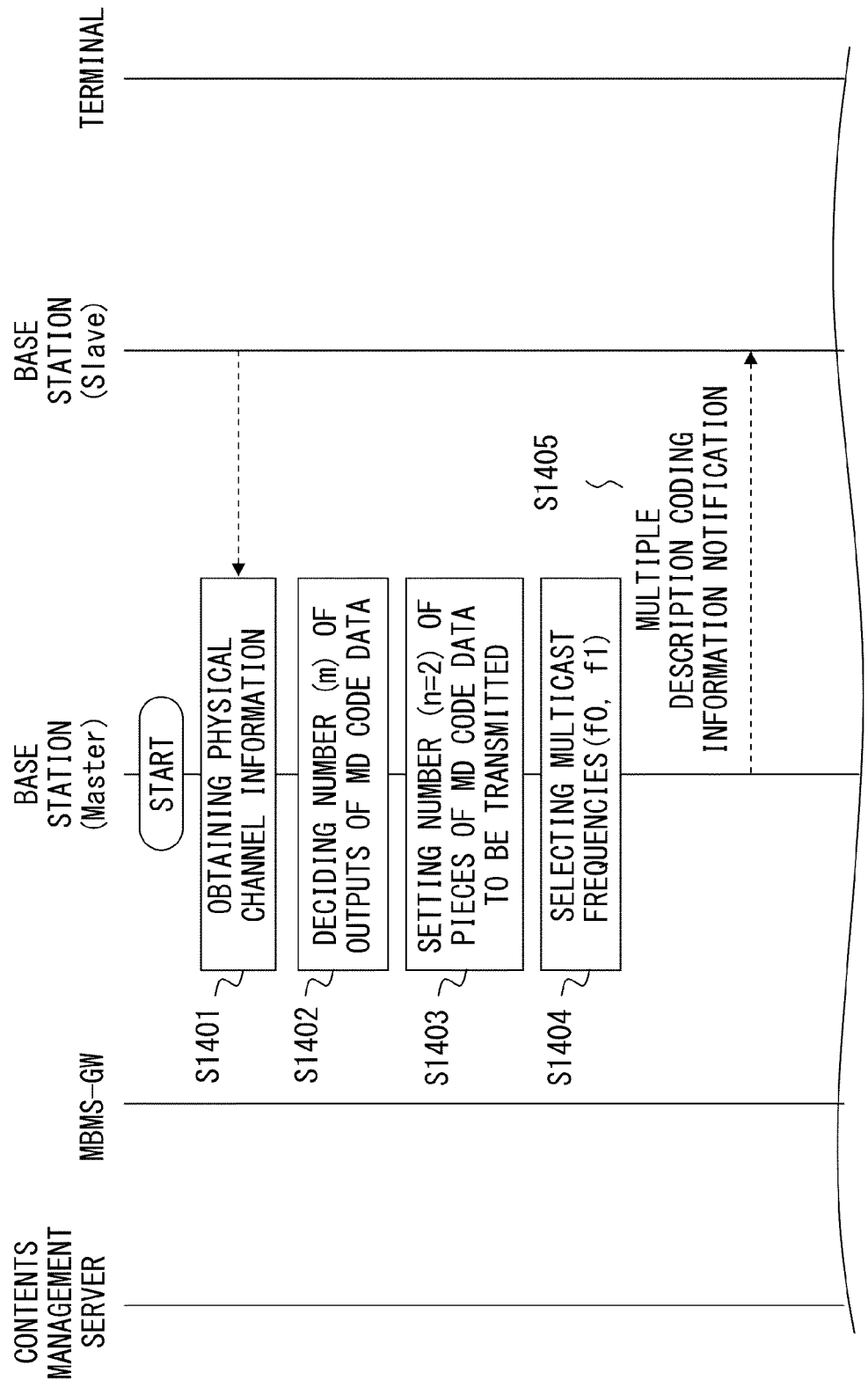
F I G. 14 A

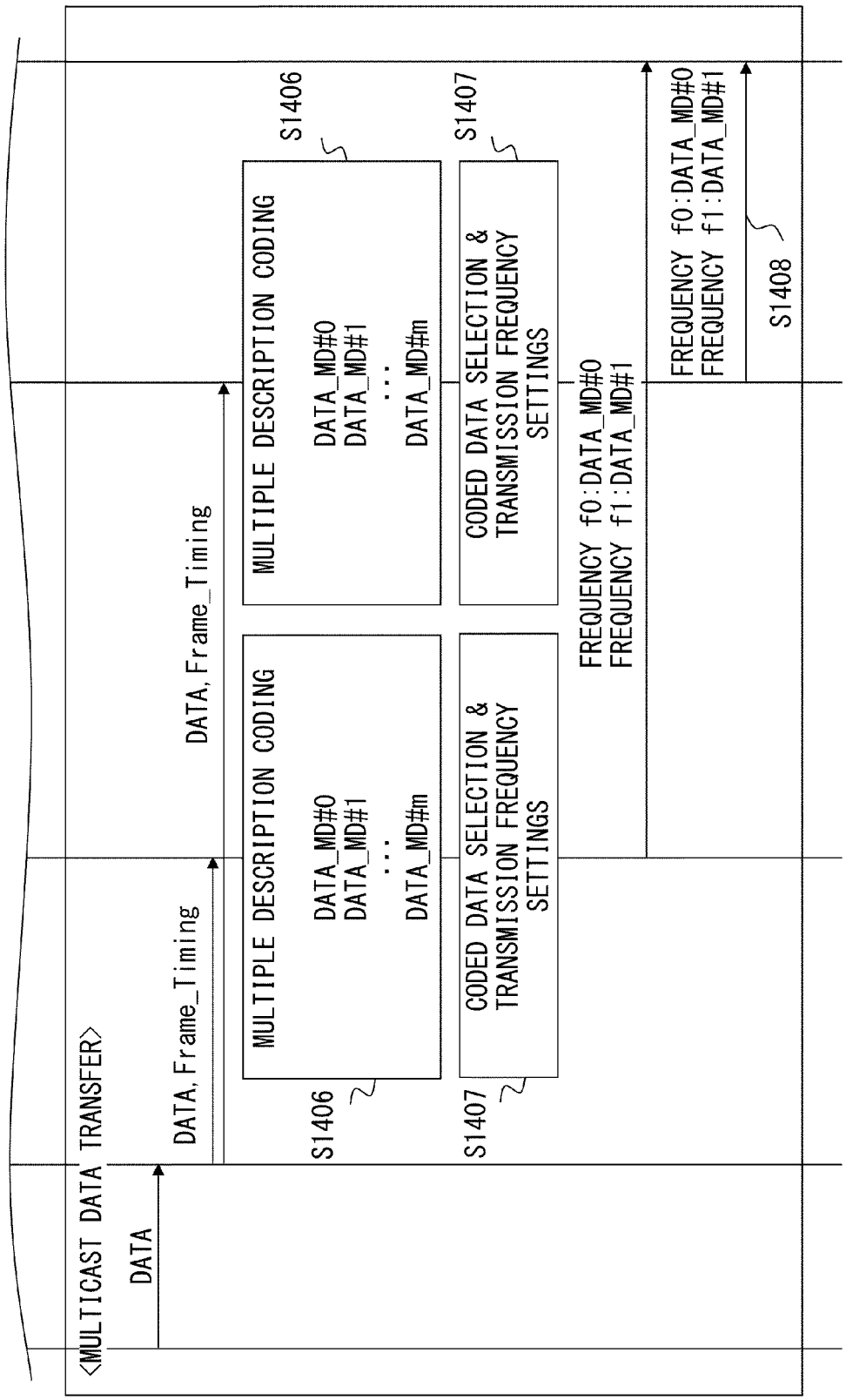
F I G. 14B

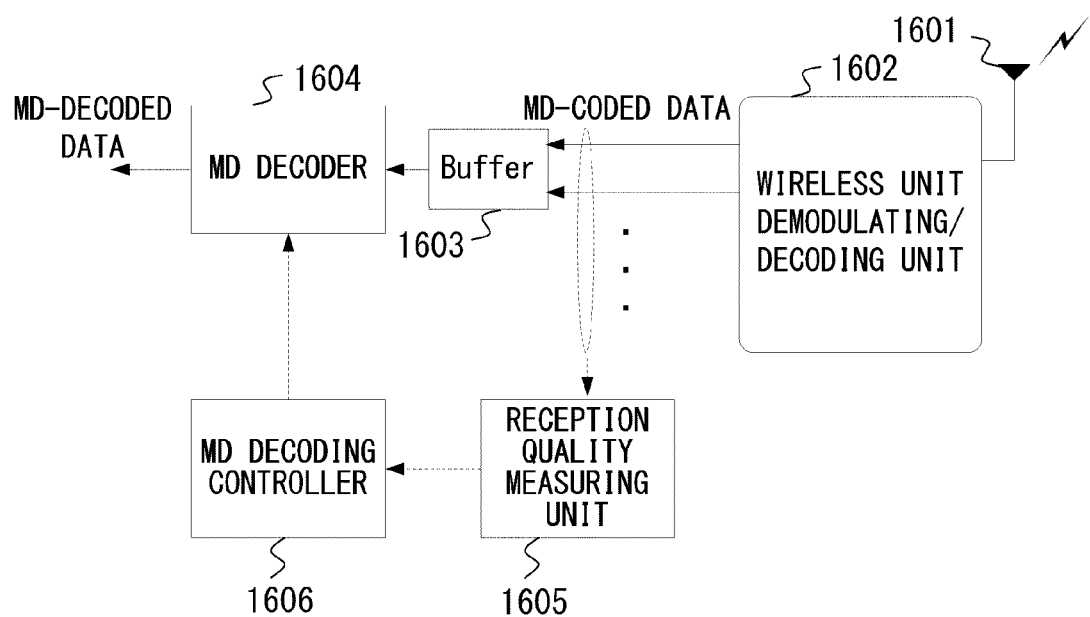
F I G. 1 6

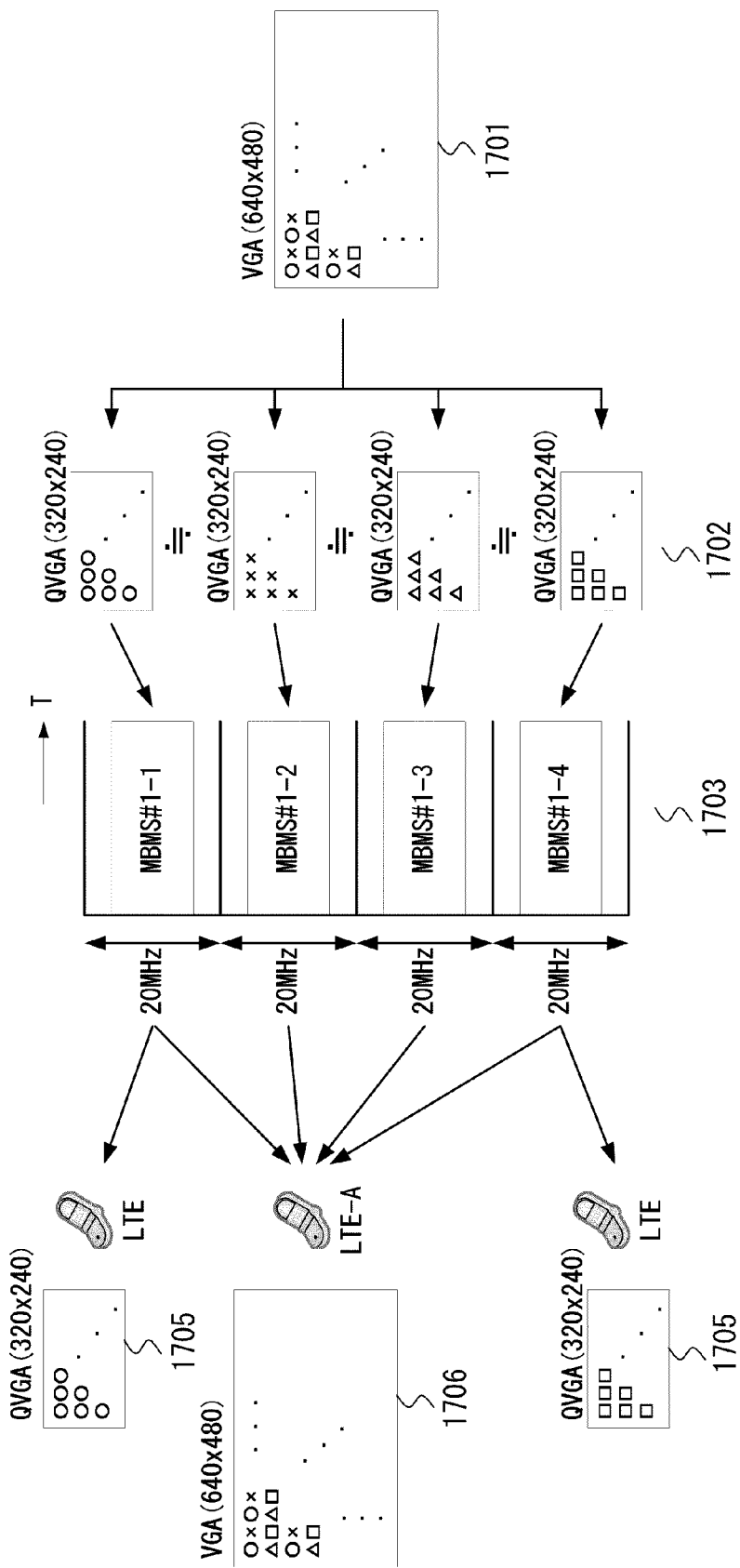
F I G. 17

MULTICAST DATA COMMUNICATION METHOD AND COMMUNICATION SYSTEM

CROSS REFERENCE TO RELATED APPLICATION

This application is a continuation of PCT application PCT/JP2009/001422, which was filed on Mar. 27, 2009, the contents of which are herein wholly incorporated by reference.

FIELD

The present invention relates to a data transmission technique in a wireless communication system. Examples of a data transmission include a broadcast/multicast transmission.

BACKGROUND

With rapid developments in recent network systems, attention has focused on a multicast communication for simultaneously transmitting, to a plurality of terminals, so-called multimedia data including video data, audio data and the like such as a network game, a teleconference, streaming delivery and the like.

Also wireless communication systems have advanced toward broadband deployment, and 3GPP (3rd Generation Partnership Project), which is a standardization body, has laid down a specification for a multicast system as MBMS (Multimedia Broadcast Multicast Service).

Additionally, 3GPP is laying down next-generation specifications for LTE (Long Term Evolution), and LTE-A (LTE-Advanced) implemented by further developing LTE. LTE-A is compatible with LTE, and may perform transmission and reception operations by simultaneously combining a plurality of frequency bands in order to improve a transmission rate.

A technique disclosed hereafter takes LTE and LTE-A as examples. However, the technique is not limited to LTE and LTE-A.

A multicast delivery system includes a server for managing multicast data, a gateway for delivering the multicast data to a plurality of base stations, the plurality of base stations for transmitting data to mobile terminals, and the mobile terminals receiving data.

Additionally, for LTE, introduction of MBSFN (MBMS Single Frequency Network) that may expand a coverage area with improvements in reception quality of mobile terminals by transmitting the same data at the same timing with the same frequency resources used by a plurality of base stations is in study.

A mobile terminal that receives a multicast service receives multicast data by selecting a service needed for the local terminal based on schedule information notified from a base station.

The mobile terminal may maintain the multicast service by executing a handover process for switching a base station from which the mobile terminal receives the data while moving. However, if a base station at a switching destination delivers the multicast service only at one frequency, the mobile terminal may not be able to perform a handover in some cases depending on the state of the base station. For example, there may be cases where the number of mobile terminals accommodated in a frequency band at the switching destination becomes too large to accommodate a new mobile terminal.

The following prior art document is disclosed as a conventional technique related to the technique disclosed by the present application.

Patent Document 1: Japanese National Publication of International Patent Application No. 2005-508584

SUMMARY

According to an aspect of an embodiment of the invention, a multicast data wireless communication method for transmitting multicast data by using a plurality of frequency bands, includes: coding the multicast data by partitioning the multicast data into a plurality of pieces of multiple description code data; setting a plurality of transmission carrier frequencies at which a plurality of base stations respectively transmit the plurality of pieces of multiple description code data; transmitting, respectively by the plurality of base stations, to concurrently transmit the plurality of pieces of multiple description code data by using the set plurality of transmission carrier frequencies; and receiving, by a terminal, any one or more of the plurality of pieces of multiple description code data transmitted from one of the plurality of base stations by using the plurality of transmission carrier frequencies, and to decoding the multicast data from the received multiple description code data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of a system configuration of a first embodiment;

FIG. 6 illustrates an example of a system configuration of a second embodiment;

FIG. 9 illustrates an operational sequence (No. 3) of the second embodiment;

FIG. 10 illustrates an example of a system configuration of a third embodiment;

FIG. 11 illustrates an operational sequence (No. 1) of the third embodiment;

FIG. 12 illustrates an operational sequence (No. 2) of the third embodiment;

FIG. 13 illustrates an example of a system configuration of a fourth embodiment;

FIGS. 14A and 14B illustrate an operational sequence (No. 1) of the fourth embodiment;

FIG. 16 illustrates an example of a system configuration of a fifth embodiment;

FIG. 17 illustrates a first specific example of MD coding;

DESCRIPTION OF EMBODIMENTS

Embodiments according to the present invention are described in detail below with reference to the drawings.

In wireless communication systems in the embodiments described below, MD (Multiple Description: hereinafter referred to as MD) code is used.

MD code has the following characteristics.

Data is partitioned into a plurality of pieces, each of which is independently valid without depending on the other partitioned pieces of data and has the same nature.

Quality is improved according to the amount of information if partitioned pieces of data are combined, and original data may be reconfigured if all the pieces of data are combined.

Figure 1:
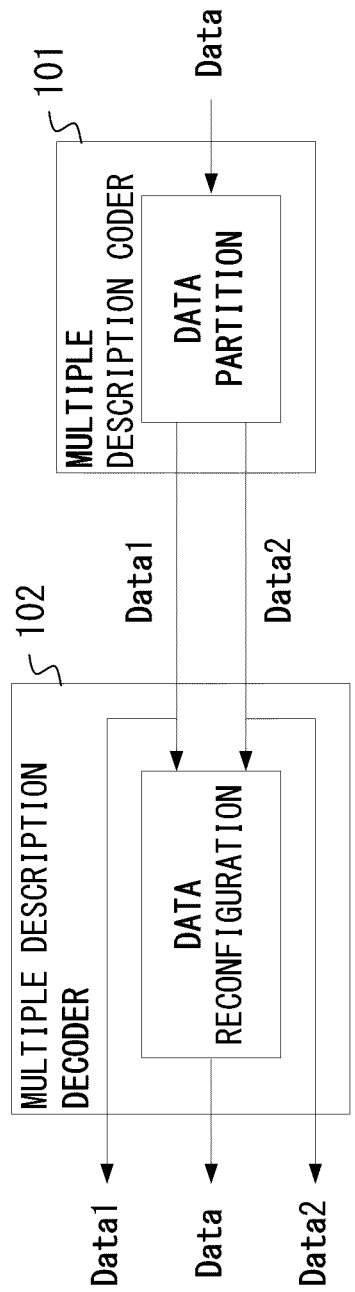
FIG. 1 illustrates a basic configuration of an MD code communication system.

FIG. 1 illustrates a basic configuration of an MD code communication system.

In an MD-coder 101, for example, a moving picture (Data) of 30 frames/sec is MD-coded into a moving picture (Data 1) of 15 frames/sec obtained from even-numbered frames of Data, and a moving picture (Data 2) of 15 frames/sec obtained from odd-numbered frames of Data.

A multiple description decoder 102 may reproduce a moving picture only with either of Data 1 and Data 2, and may also reproduce a moving picture of the original quality by receiving and reconfiguring both of the data. Namely, by using both of the data compared with the case of using either of the data, a moving picture of higher quality may be reproduced.

A base station implemented in each of the embodiments allocates the data (Data 1 and Data 2) MD-coded as described above to frequency bands for performing a multicast transmission, and simultaneously transmits the data.

As a result, a mobile terminal may receive a multicast service if it may receive at least either of the frequency bands to which Data 1 and Data 2 are respectively allocated.

Additionally, a mobile terminal, such as an LTE-A terminal, which may perform a reception operation by simultaneously combining a plurality of frequency bands, may receive a multicast service of improved quality by receiving a plurality of pieces of MD-coded data and by reconfiguring the original data, compared with a terminal that performs a communication in a signal frequency band.

A first embodiment based on the above described basic configuration of the MD code communication system is described below.

FIG. 2 illustrates an example of a system configuration of the first embodiment. The first embodiment represents a network configuration where a gateway MD-codes multicast data.

The multicast data (DATA) stored in a contents management server 201 is delivered to each of base stations 203 (two base stations 203 (#1) and 203 (#2) in the example of FIG. 2) that perform a multicast transmission via a gateway (MBMS-GW: Multimedia Broadcast Multicast Service Gateway) 202.

In the MBMS-GW 202, an MD coder 202-1 MD-codes the multicast data received from the contents management server 201. FIG. 2 illustrates the example where the multicast data is MD-coded in two frequency bands, and DATA_MD #0 and DATA_MD #1 are generated from DATA. Assume that the number of pieces of coded data in the MBMS-GW 202 is adjusted in advance to match that of the base stations 203 side. The MD code data, DATA_MD #0 and #1, generated by the MBMS-GW 202 are respectively delivered to the base stations 203. When respectively transmitting the respective pieces of MD code data to the base stations 203, the MBMS-GW 202 respectively reports, to the base stations 203, with which wireless frame each piece of the data is transmitted.

In the base stations 203 that respectively receive the MD code data DATA_MD #0 and #1, frequencies for respectively multicast-transmitting the MD code data are decided by a transmission frequency setting unit 203-1, which may be realized by a processor (e.g., DSP, CPU), and the MD code data are simultaneously multicast-transmitted respectively at the decided frequencies. In the first embodiment, there is no need to set the same MD code data to the same frequency bands for each of the base stations 203. In the example of FIG. 2, the base station 203 (#1) sets DATA_MD #0 and DATA_MD #1 to a frequency Freq #0 and a frequency Freq #1, respectively. In contrast, the base station 203 (#2) sets DATA_MD #1 and DATA_MD #0 to the frequency Freq #0 and the frequency Freq #1, respectively.

An LTE terminal 204 that receives the multicast data at the frequency Freq #1 from the base station 203 (#1) may continue to receive the multicast service even when switching the reception frequency to Freq #0 at the time of a handover to the base station 203 (#2). Moreover, the LTE-A terminal 205 reconfigures the original DATA from the data DATA_MD #0 and DATA_MD #1, which are received at the respective frequencies, if the LTE-A terminal 205 may receive the multicast data at both of the frequency Freq #0 and the frequency Freq #1. Accordingly, the LTE-A terminal 205 may receive the service of higher quality than that of the LTE terminal 204 from whichever base station 203 #1 or 203 #2.

Details of the operations of the above described first embodiment implemented as the example of FIG. 2 are described below.

An initial setting process executed between the MBMS-GW 202 and the base stations 203 in a multicast transmission is described with reference to an operational sequence (No. 1) of the first embodiment illustrated in FIGS. 3A and 3B.

Figure 3A:
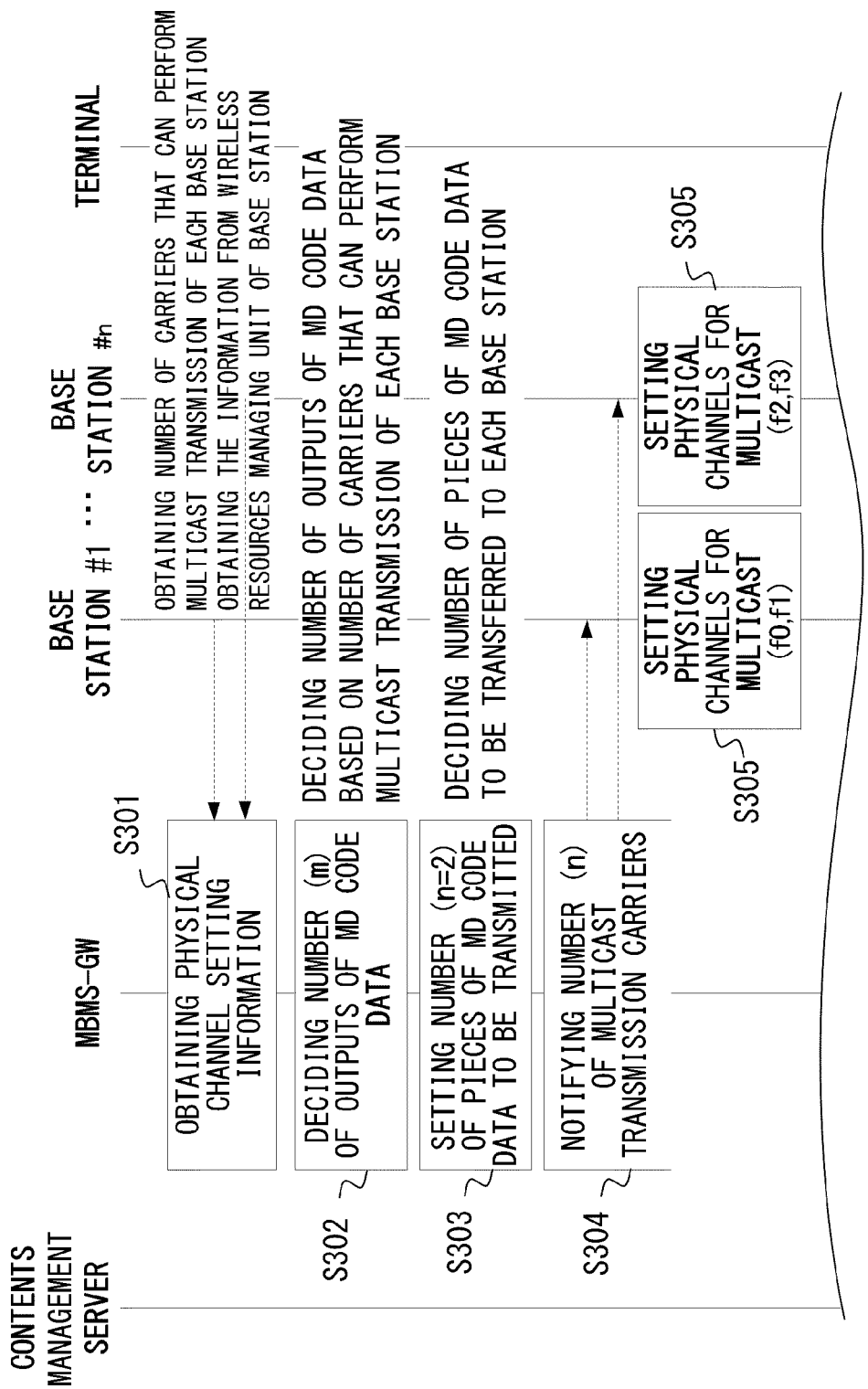
FIGS. 3A and 3B illustrate an operational sequence (No. 1) of the first embodiment.

The MBMS-GW 202 obtains physical channel setting information respectively from the base stations 203 that manage wireless resources (step S301 of FIG. 3A). In this information, a maximum number of carriers that may perform a multicast transmission is set.

The MBMS-GW 202 decides the number (m) of outputs of MD code data based on the maximum number of multicast transmission carriers respectively for the base stations 203 (step S302 of FIG. 3A).

Next, the MBMS-GW 202 sets the number (n) of multicast transmission carriers (step S303 of FIG. 3A).

Then, the MBMS-GW 202 respectively notifies the base stations 203 of the number (n) of multicast transmission carriers (step S304 of FIG. 3A). The MBMS-GW 202 notifies the base stations 203 of the maximum number of carriers that may perform a multicast transmission in all cases if the number of transmission carriers is not changed with an increase/decrease of a terminal 204 or 205. If changing the number of transmission carriers with an increase/decrease in the number of terminals 204 and 205, the MBMS-GW 202 sets a minimum value (1 carrier) respectively in the base stations 203 as an initial setting. The MBMS-GW 202 transfers, to the base stations, MD code data by the number of transmission carriers, which is reported to the base stations.

The base stations 203 that have been notified of the number of multicast transmission carriers arbitrarily and individually select carriers for performing a multicast transmission, and set physical channels for multicast (step S305 of FIG. 3A). The base stations 203 may take measures such as a measure of increasing the number of accommodated terminals by using a carrier that is not selected for the multicast as that for a unicast communication, or a measure of leaving the unselected carrier unused to reduce power consumption against the unselected carrier.

Next, operations performed when a data delivery is performed by establishing a multicast connection between the terminal 204 or 205 and the network in the first embodiment are described with reference to an operational sequence (No. 1) of the first embodiment illustrated in FIGS. 3 A and B.

The following process for transmitting data from the contents management server 201 to the MBMS-GW 202, to the base stations 203, and to the LTE terminal 204 or the LTE-A terminal 205 is executed for each frame.

Figure 3B:
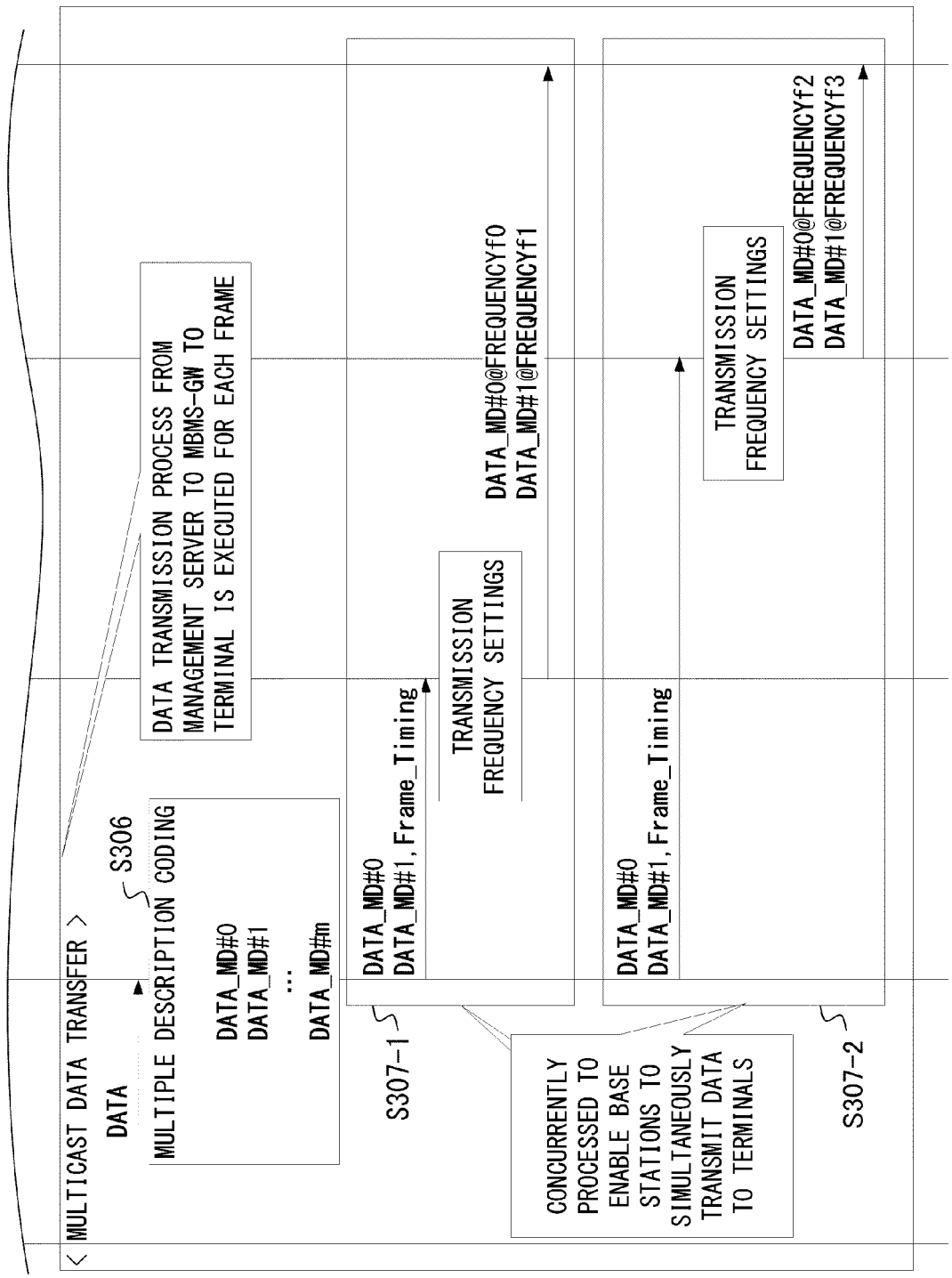

In the MBMS-GW 202 that has received the multicast data delivered from the contents management server 201, the MD coder 202-1 MD-codes the received data to generate coded data by a preset number of outputs (step S306 of FIG. 3B). In the example of FIGS. 3 A and B, coded data DATA_MD #0, DATA_MD #1, . . . DATA_MD #m are generated from the received data DATA.

The MBMS-GW 202 arbitrarily selects data to be delivered to the base stations 203 from among the generated MD-coded data, and delivers the selected data respectively to the base stations 203. Assume that the data delivery from the MBMS-GW 202 to the base stations 203 is concurrently and parallely performed (steps S307-1, S307-2 and the like of FIG. 3B). Moreover, the MBMS-GW 202 specifies timing information indicating at which wireless timing each piece of the MD-coded data is to be transmitted.

The base stations 203 that have received the MD-coded data set and transmit the MD code data at the frequencies preset at timing specified by the MBMS-GW 202 with each transmission frequency setting unit 203-1 (see FIG. 2) (steps S307-1, S307-2 and the like of FIG. 3B). All pieces of MD-coded data respectively transmitted by the base stations 203 vary depending on each transmission carrier. With which carrier which piece of data is transmitted is arbitrarily set.

The LTE-A terminal 205 that may simultaneously receive a plurality of frequencies uses multicast data by combining and reconfiguring the MD code data received at the same timing. The number of pieces of MD code data that may be combined, delivery frequencies and the like are notified from the corresponding base station 203 when a service connection is established.

Next, operations performed when frequencies for performing a multicast transmission are allowed to be changed according to an increase/decrease in the number of accommodated terminals, a service quality requested by the LTE-A terminal are described with reference to an operational sequence (No. 2) of the first embodiment illustrated in FIGS. 4A and 4B.

Figure 4A:
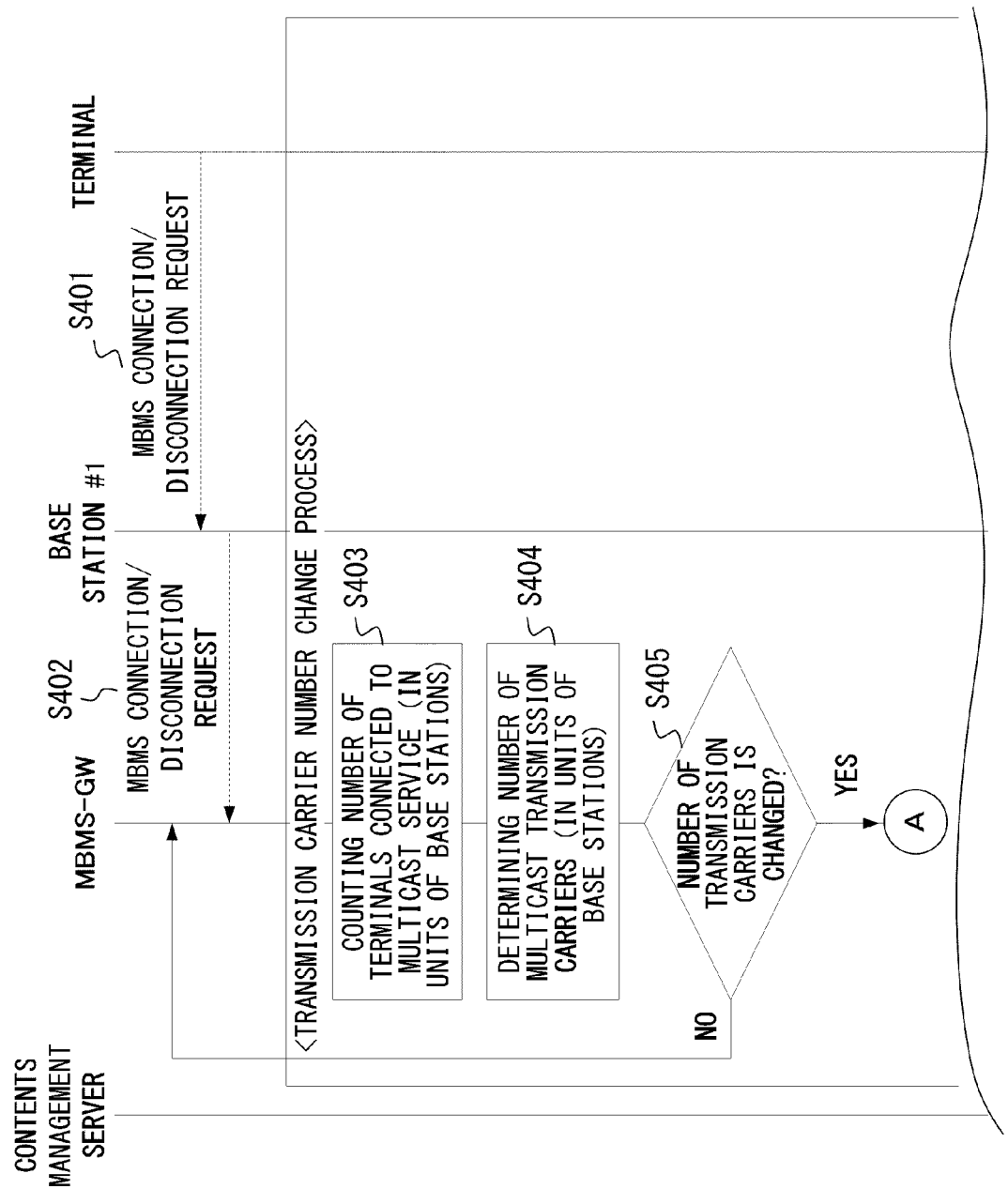
FIGS. 4A and 4B illustrate an operational sequence (No. 2) of the first embodiment.

When the LTE-A terminal 205 (FIG. 2) makes a multicast service connection/disconnection/change request to the corresponding base station 203 (step S401 of FIG. 4A), the base station 203 notifies the MBMS-GW 202 of this event (step S402 of FIG. 4A). Assume that a service quality requested value (a bit rate of a moving picture or audio data) is set in the connection request or the change request.

The MBMS-GW 202 counts the number of terminals connected to the multicast service in units of base stations 203 according to the event (step S403 of FIG. 4A). This count operation is an addition operation if the connection request is made, a subtraction operation if the disconnection request is made, or a no-change operation if the change request is made.

The MBMS-GW 202 determines the number of multicast transmission carriers in units of base stations 203 according to the counted number of connected terminals and the requested quality (step S404 of FIG. 4A). For example, the following methods are considered.

Setting the number of carriers, which satisfies the maximum value of the requested quality. In this case, the maximum number of carriers may be set even if the number of terminals is small.

Setting the number of carriers, which satisfies the number of accommodated terminals and corresponds to an average value of the requested quality. Specifically, the following procedures are executed.

Procedure 1: Determining the number of transmission carriers based on the number of accommodated terminals.

Calculating the number of carriers needed to accommodate terminals based on the following equation (1).

$$A = \text{number of accommodated terminals}/N \qquad (1)$$

where N is the number of terminals that may be accommodated in one carrier.

Procedure 2: Determining an average value of quality requested by all the terminals.

Quality is converted from a bit rate to the number of carriers, and the following equation 2 is calculated.

$$B = \text{average number of carriers requested by terminal} \qquad (2)$$
$$= \frac{\left(1 \times \text{number of } LTE \text{ terminals} + \sum_{i=1}^{\text{number of } LTE\text{-}A \text{ terminals}} Y_i\right)}{\text{number of accomodated terminals}}$$

where $Y_i$ is the number of carriers requested by an ith LTE-A terminal (calculated based on the requested quality).

Procedure 3: Determining the number of carriers, which satisfies the number of accommodated terminals and the average value of the requested quality (final results).

$$C = \text{calculated number of carriers} = \lceil \max(A,B) \rceil \qquad (3)$$

where the higher value is selected out of A and B in max (A,B), and $\lceil X \rceil$ is a minimum integer larger than X.

Figure 4B:
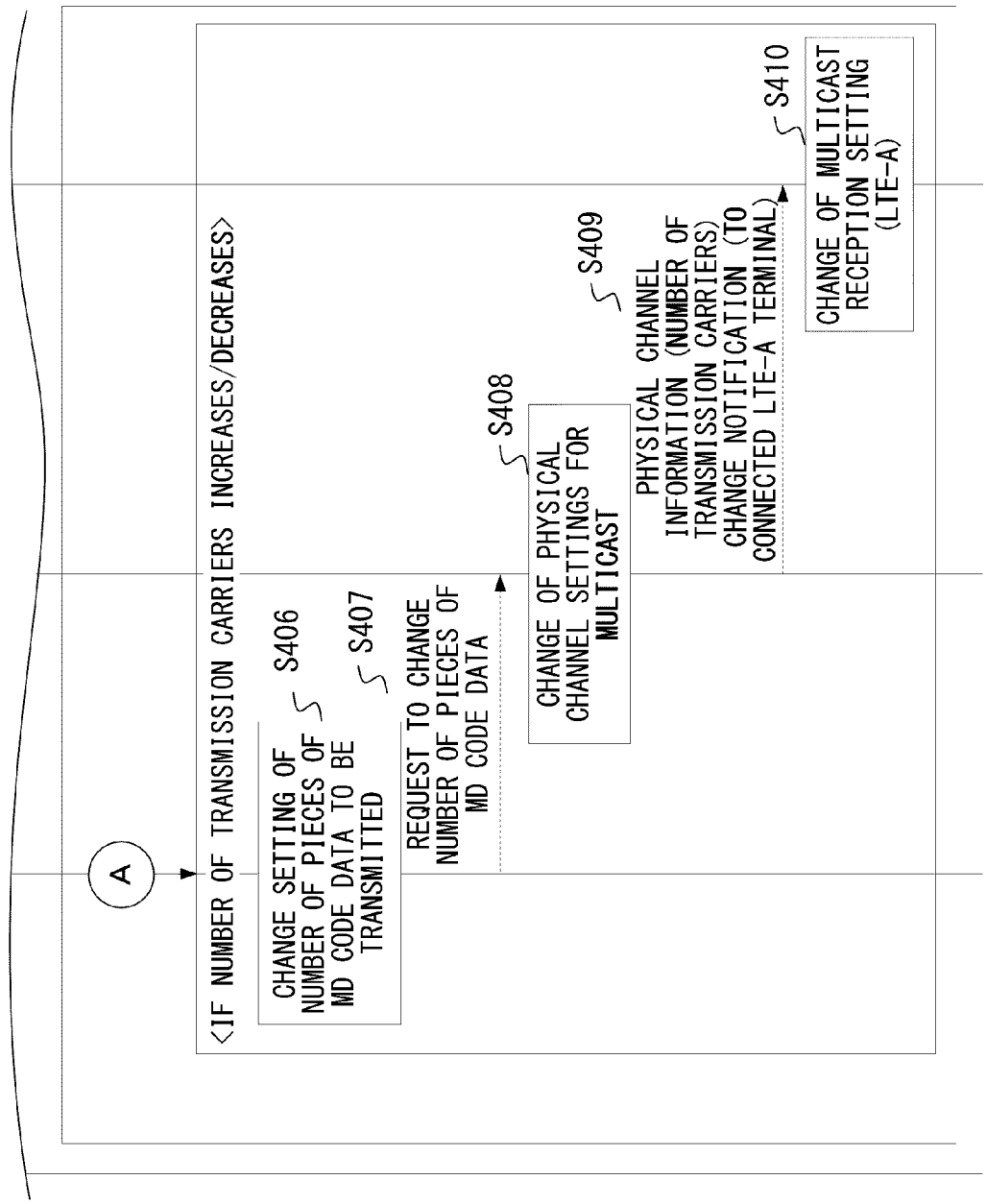

If the number of carriers determined as described above is changed from the currently set number, the MBMS-GW 202 changes the number of pieces of MD code data to be transmitted to the base station 203 (step S406 of FIG. 4B). As a result, a request to change (increase/decrease) the number of pieces of MD code data to be multicast-transmitted is reported to the base station 203 (step S407 of FIG. 4B).

The base station 203 that has received the notification changes the physical channel settings of itself according to the number of pieces of transmission data (step S408 of FIG. 4B). As a result, the base station 203 notifies the LTE-A terminal 205 that is already receiving the multicast service of the change of the setting information and the physical channel information (the number of transmission carriers) (step S409 of FIG. 4B). Since a reply is separately made to the LTE-A terminal 205 that has made the connection/disconnection/change request, the change of the setting information and the physical channel information (the number of transmission carriers) may be notified within the reply.

The LTE-A terminal 205 that has received the change notification of the setting information sets an increase/decrease of a reception carrier as needed (step S410 of FIG. 4B). As a result, a multicast transmission carrier is increased in the state of receiving data with the number of carriers, which is smaller than the request, or a multicast transmission carrier that receives the data so far is removed.

Additionally, the LTE terminal 204 that is receiving the multicast service with a carrier to be removed is instructed to perform a handover to another carrier.

Next, operations performed when the number of accommodated terminals changes due to a move of the LTE terminal 204 or the LTE-A terminal 205 to another base station with a handover are described with reference to an operational sequence (No. 3) of the first embodiment illustrated in FIG. 5.

Figure 5:
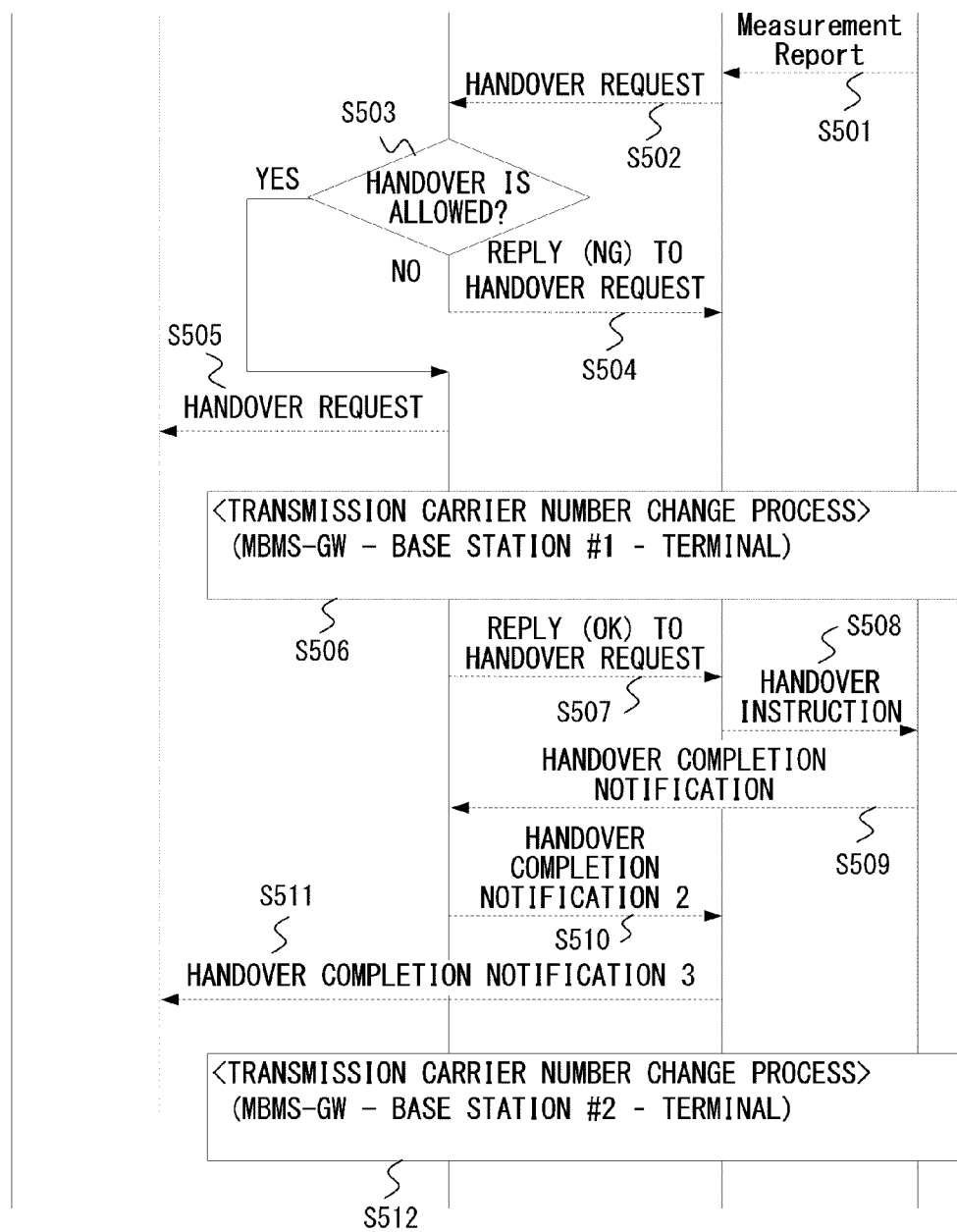
FIG. 5 illustrates an operational sequence (No. 3) of the first embodiment.

For a handover performed by the terminal 204 or 205, the terminal 204 or 205 initially notifies the corresponding base station 203 to which the terminals belongs of a measurement result of a neighboring cell (step S501 of FIG. 5). This notification is called Measurement Report.

The base station 203 that has received Measurement Report issues a Handover request for inquiring the base station 203 as a handover destination candidate about whether or not a handover is allowed (step S502 of FIG. 5). Assume that the base station 203 that has received Measurement Report is the base station 203 (#2) and the base station 203 as the handover destination candidate is the base station 203 (#1).

The base station 203 (#1) that has received the Handover request determines whether or not to allow the handover, namely, whether or not to be able to accept a new terminal (step S503 of FIG. 5). If the new terminal may not be accepted, the base station 203 (#1) returns a reply (NG) to the Handover request to the base station 203 (#2), and the process is terminated (step S504 of FIG. 5). If the new terminal may be accepted, the base station 203 (#1) notifies the MBMS-GW 202 that the handover request has been issued (step S505 of FIG. 5).

The MBMS-GW 200 that has received the notification executes a process similar to the transmission carrier number change process executed from step S403 to S410 of FIGS. 4A and 4B (step S506 of FIG. 5). Namely, the MBMS-GW 202 calculates the number of multicast transmission carriers when the new terminal is accommodated, and notifies the base station 203 (#1) at the handover destination of a change of the number of multicast transmission carriers if the number of multicast transmission carriers is changed. Then, the base station 203 (#1) notifies the terminal 204 or 205 that is multicast-receiving in itself of the state change.

The base station 203 (#1) at the handover destination returns a reply (OK) to the Handover request to the base station 203 (#2) at the handover request source (step S507 of FIG. 5).

The base station 203 (#2) that has received the reply (OK) to the Handover request instructs the terminal 204 or 205, which has issued Measurement Report, to perform a handover (Handover instruction transmission) (step S508 of FIG. 5).

The terminal 204 or 205 that has received the Handover instruction message reconnects to the specified base station 203 (#1), and issues a Handover completion notification to the base station 203 (#1) (Handover completion notification) (step S509 of FIG. 5).

The base station 203 (#1) at the handover destination notifies the base station 203 (#2) at the handover source that the handover has been complete (Handover completion notification 2) (step S510 of FIG. 5).

The base station 203 (#2) at the handover source that has received the Handover completion notification notifies the MBMS-GW 202 that the handover has been complete (Handover completion notification 3) (step S511 of FIG. 5).

The MBMS-GW 202 that has received the Handover completion executes a process similar to the transmission carrier number change process executed from step S403 to S410 of FIGS. 4A and 4B (step S512 of FIG. 5). As a result, the MBMS-GW 202 determines whether or not a multicast transmission carrier may be reduced along with a decrease in the number of accommodated terminals for the base station 203 (#2) at the handover source, so that the number of multicast transmission carriers is changed as needed.

FIG. 6 illustrates an example of a system configuration of a second embodiment. The second embodiment represents a network configuration where a gateway MD-codes multicast data and an MBSFN environment is configured.

In the system configuration of FIG. 6, a contents management server, an MBMS-GW, base stations and terminals are denoted with the same reference numerals as those of the system configuration of the first embodiment illustrated in FIG. 2. Also an MD coder 202-1 within the MBMS-GW 202 of FIG. 6 is denoted with the same reference numeral as that of the system configuration illustrated in FIG. 2.

The configuration of FIG. 6 is changed from that of FIG. 2 in a point that a transmission frequency setting unit 601, which may be realized by a processor (e.g., DSP, CPU), is provided within the MBMS-GW 202 as a replacement for the transmission frequency setting unit 203-1 within each of the base stations 203 in FIG. 2.

In FIG. 6, multicast data (DATA) stored in the contents management server 201 is delivered to the base stations 203 that perform a multicast transmission via the MBMS-GW 202 in a similar manner as in the first embodiment of FIG. 2.

Similarly to the first embodiment of FIG. 2, in the MBMS-GW 202, the MD coder 202-1 MD-codes the multicast data received from the contents management server 201.

In contrast, unlike the first embodiment of FIG. 2, in the MBMS-GW 202, the transmission frequency setting unit 601 decides frequencies such that the base stations 203 transmit the same MD-coded data at the same frequencies.

The pieces of MD code data generated by the MBMS-GW 202 are respectively delivered to the base stations 203 along with transmission frequency information. In the example of FIG. 6, DATA_MD #0 and DATA_MD #1 are set to a frequency Freq #0 and a frequency Freq #1, respectively.

The base stations 203 that have received the MD code data simultaneously multicast-transmit the respective pieces of MD code data at the specified frequencies. As a result, the same data are transmitted at the same frequencies among the base stations 203, so that the MBSFN environment may be configured.

In the second embodiment, a multicast service at the time of a handover may be continued, and a service of higher quality may be rendered to an LTE-A terminal that may simultaneously receive the multicast service in a plurality of frequency bands.

Additionally, since the MBMS-GW 202 is responsible for setting transmission frequencies in the second embodiment, the configuration of a large number of needed base stations 203 may be simplified.

Details of the operations of the above described second embodiment implemented as the example of FIG. 6 are described below.

Initially, an initial setting process executed between the MBMS-GW 202 and the base stations 203 in a multicast transmission in the second embodiment is described with reference to an operational sequence (No. 1) of the second embodiment illustrated in FIGS. 7A and 7B.

Figure 7A:
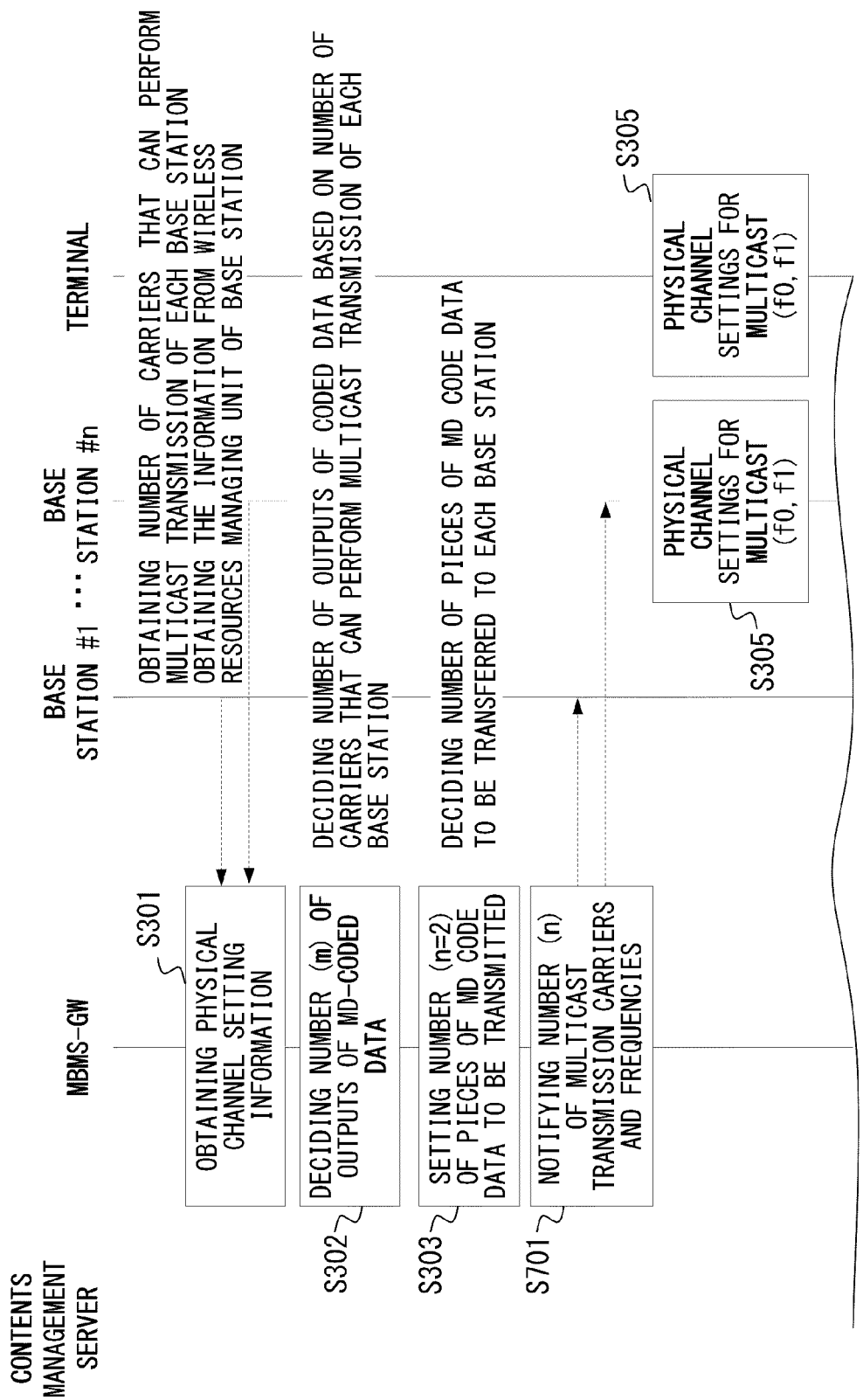
FIGS. 7A and 7B illustrate an operational sequence (No. 1) of the second embodiment.
Figure 7B:
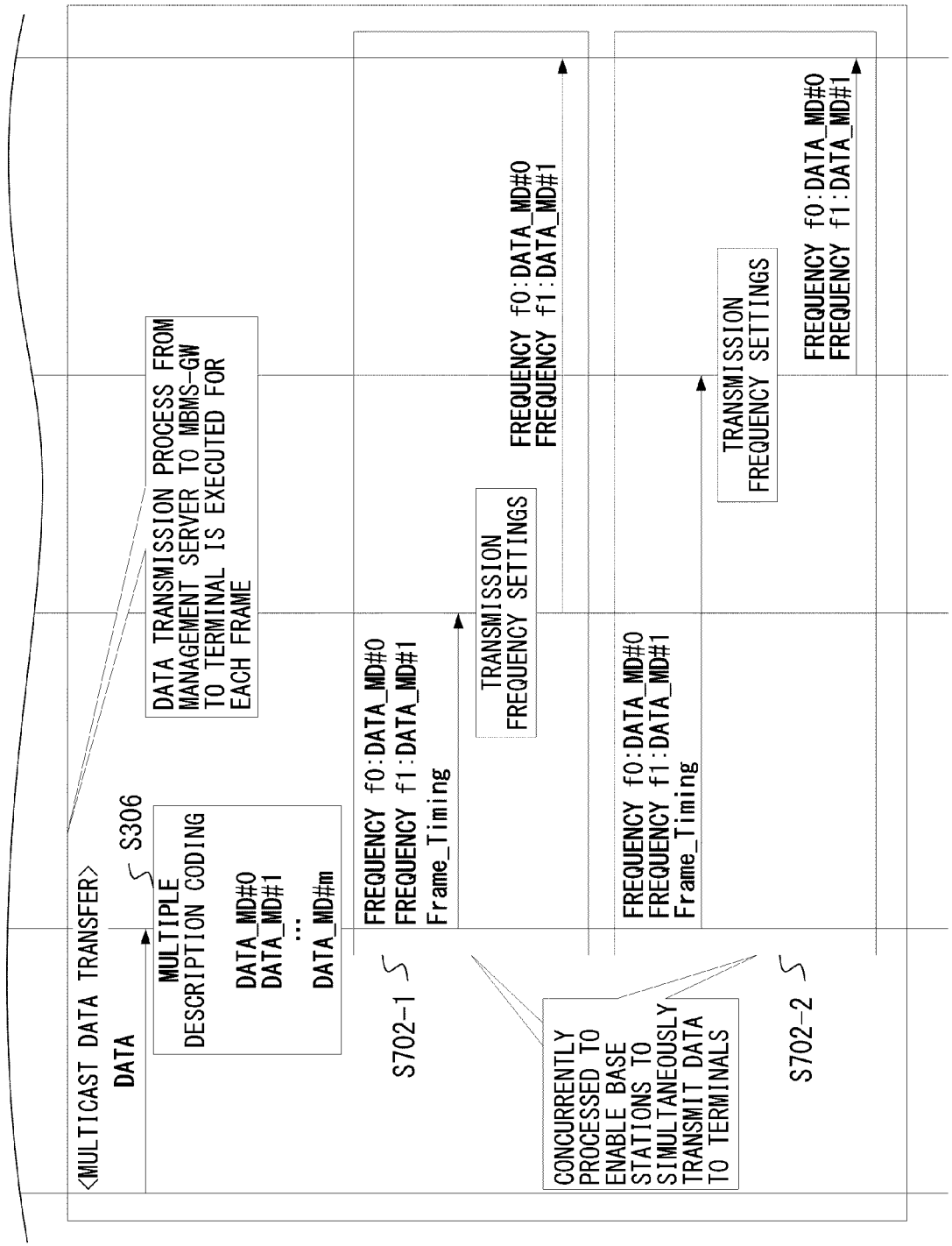

The same processes in the operational sequence (No. 1) of the second embodiment illustrated in FIGS. 7A and 7B as those of the operational sequence (No. 1) of the first embodiment illustrated in FIGS. 3A and 3B are denoted with the same reference numerals as those of FIGS. 7A and 7B.

In FIG. 7A, the MBMS-GW 202 obtains physical channel setting information respectively from the base stations 203 that manage wireless resources (step S301 of FIG. 3A). In this information, at least the number of carriers that may perform a multicast transmission, and frequencies of the carriers are set. Since the second embodiment assumes to configure MBSFN, the information obtained from the stations 203 include at least a common frequency of one carrier. A base station that does not have the common frequency is excluded from MBSFN targets. For the common frequency, its frequency information is held as a carrier list.

In FIG. 7A, processes such as a decision of the number (m) of outputs of MD-code data (step S302), and setting of the number (n) of pieces of MD code data to be transmitted (step S303) are similar to those of the first embodiment illustrated in FIG. 3A.

Next, the MBMS-GW 200 respectively notifies the base stations 203 of the number (n) of multicast transmission carriers, and of frequencies for performing a multicast transmission (step S701). All values reported to the base stations 203 are the same since MBSFN is configured. Processes other than the frequency notification are similar to those of the first embodiment illustrated in FIGS. 3A and 3B.

In FIG. 7A, a process for setting physical channels for multicast (step S305), respectively executed by the base stations 203 upon receipt of the notification in step S701, is similar to that of the first embodiment illustrated in FIG. 3A.

Next, operations performed when a data delivery is performed by establishing a multicast service connection between the terminal 204 or 205 and the network in the second embodiment are described with reference to an operational sequence (No. 1) of the second embodiment illustrated in FIGS. 7A and 7B.

In FIG. 7B, an MD coding process (step S306) is similar to that of the first embodiment illustrated in FIG. 3B.

In FIG. 7B, a process for delivering selected MD-coded data and timing information respectively to the base stations 203 is similar to that of the first embodiment illustrated in FIG. 3B. However, the base stations 203 are respectively instructed to transmit the same data at the same frequencies.

The base stations 203 that have received the MD code data respectively transmit the MD code data at the timing and the frequencies, which are specified by the MBMS-GW 202 (steps S702-1, S702-2 and the like of FIG. 7B).

A process of the LTE-A terminal 205, executed in response to the above described transmission process of the MD code data from the respective base stations 203, is similar to that of the first embodiment illustrated in FIG. 3B.

Next, operations performed when a frequency for performing a multicast transmission is allowed to be changed with an increase/decrease in the number of accommodated terminals and the service quality requested by the LTE-A terminal are described with reference to an operational sequence (No. 2) of the second embodiment illustrated in FIGS. 8A and 8B.

Figure 8A:
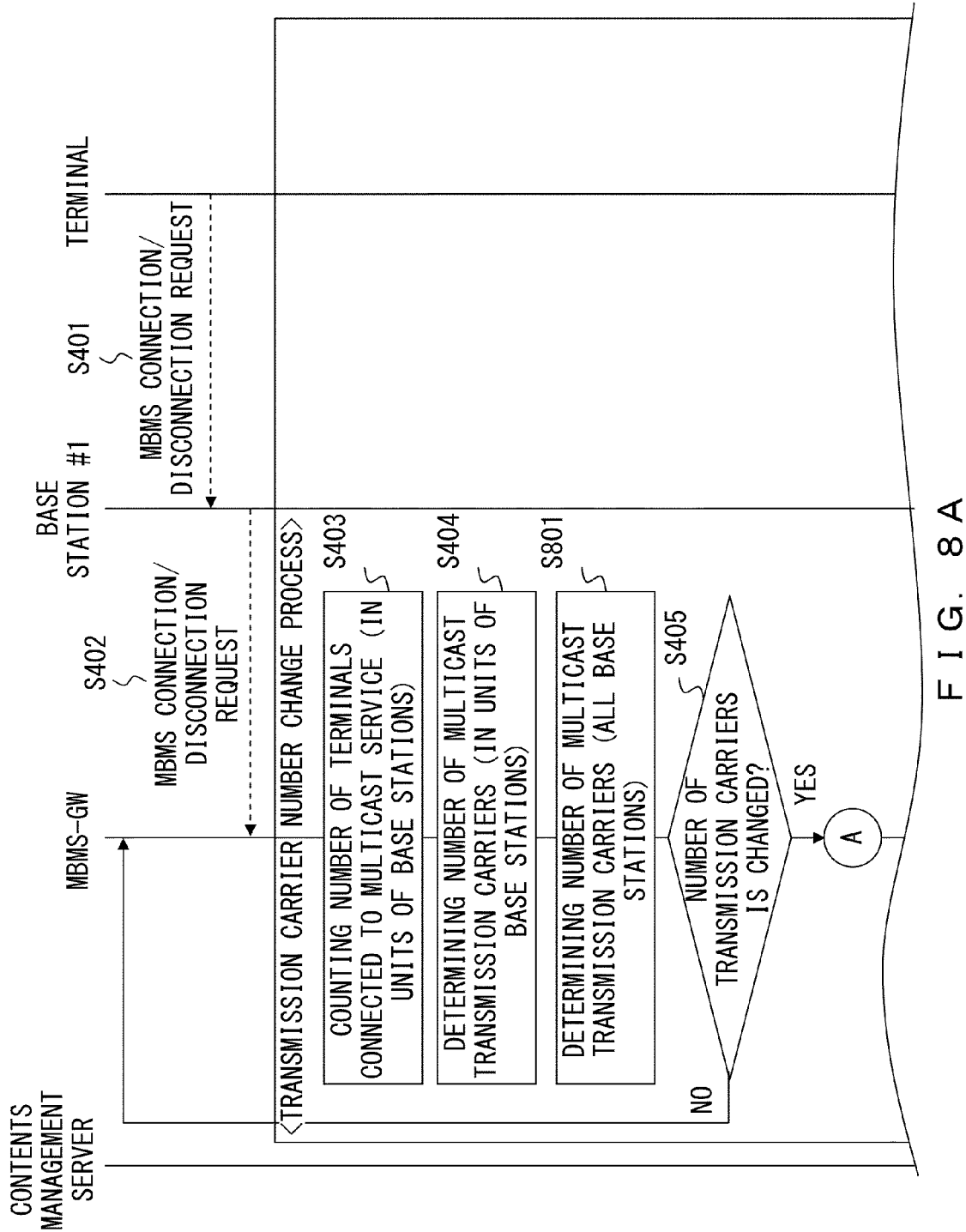
FIGS. 8A and 8B illustrate an operational sequence (No. 2) of the second embodiment.
Figure 8B:
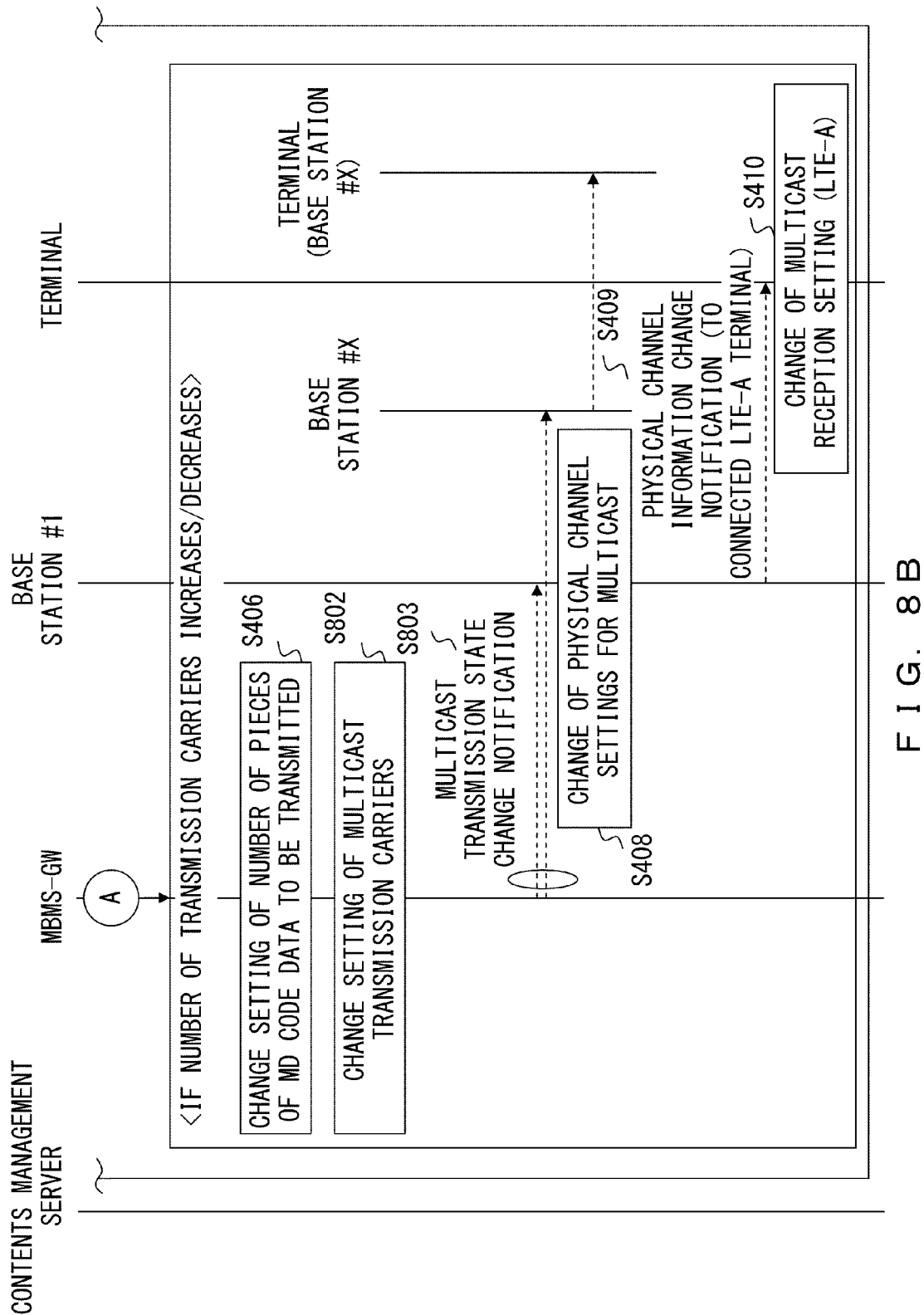

The same processes in the operational sequence (No. 2) of the second embodiment illustrated in FIGS. 8A and 8B as those in the operational sequence (No. 2) of the first embodiment illustrated in FIGS. 4A and 4B are denoted with the same reference numerals as those of FIGS. 4A and 4B.

In FIG. 8A, notification processes of steps S401 and S402 are similar to those of the first embodiment illustrated in FIG. 4A. Moreover, in FIG. 8A, a process for counting the number of terminals connected to a multicast service in units of base stations 203 (step S403), and a process for determining the number of multicast transmission carriers in units of base stations 203 (step S404) are similar to those of the first embodiment illustrated in FIG. 4A.

In the second embodiment, to maintain MBSFN, all the base stations 203 configuring MBSFN need to perform a multicast transmission at the same frequencies. Accordingly, the MBMS-GW 202 decides transmission carriers for the entire MBSFN based on the number of transmission carriers, which is determined for each of the base stations 203 in step S404 (step S801 of FIG. 8A). The following methods are considered similarly to step S404.

The maximum number of carriers is selected based on the counted number of transmission carriers of each of the base stations 203 in order to satisfy the quality requested by the terminal as much as possible. In this case, the maximum number of carriers may be set even though the number of terminals is small.

A minimum number of carriers, which satisfies the number of terminals accommodated within each of the base stations 203, is selected by giving precedence to saving of resources.

If the number of carriers, which is determined in step S801 of FIG. 8A, is changed from the currently set number, the MBMS-GW 202 changes the number of pieces of MD code data transmitted to a corresponding base station 203 (step S406 of FIG. 4B). The MBMS-GW 202 also changes the number of pieces of MD code data transmitted to all the base stations 203 (step S802 of FIG. 8B). As a result, a request to change (increase/decrease) the number of pieces of MD code data to be multicast-transmitted is reported to all the base stations 203 (step S803 of FIG. 8B).

A physical channel setting change (step S408) performed by the base stations 203 that have received the above described notification, and a setting change notification to the LTE-A terminal 205 (step S409) are similar to those of the first embodiment illustrated in FIG. 4B. Moreover, also setting (step S410) of an increase/decrease a reception carrier in the LTE-A terminal 205 that has received the setting change notification is similar to that of the first embodiment illustrated in FIG. 4B.

Next, operations performed when the number of accommodated terminals is changed by a move of the LTE terminal 204 or the LTE-A terminal 205 to another base station as a result of a handover are described with reference to an operational sequence (No. 3) of the second embodiment illustrated in FIG. 9.

The same processes in the operational sequence (No. 3) of the second embodiment illustrated in FIG. 9 as those of the operational sequence (No. 3) of the first embodiment illustrated in FIG. 5 are denoted with the same reference numerals as those of FIG. 5.

A flow of a basic process executed in the second embodiment based on FIG. 9 is similar to that of the first embodiment illustrated in FIG. 5. However, a transmission carrier number change process executed when the MBMS-GW 202 receives a handover request notification from a base station 203 at a handover destination (step S505) is a control process executed from step S403 to S410 of not FIGS. 4A and 4B but FIGS. 8A and 8B. Moreover, also a transmission carrier number change process executed when the MBMS-GW 202 receives a Handover completion notification 3 from a base station 203 at a handover source (step S511) is a control process executed from step S403 to S410 of not FIGS. 4A and 4B but FIGS. 8A and 8B.

FIG. 10 illustrates an example of a system configuration of a third embodiment. The third embodiment represents a network configuration where base stations MD-code multicast data.

In the system configuration of FIG. 10, a contents management server, an MBMS-GW, the base stations and terminals are denoted with the same reference numerals as those of the system configuration of the first embodiment illustrated in FIG. 2.

The configuration of FIG. 10 is changed from that of FIG. 2 in a point that an MD coder 1001 is respectively provided in addition to the transmission frequency setting unit 203-1 within the base stations 203 as a replacement for the MD coder 202-1 within the MBMS-GW 202 in the configuration of FIG. 2.

In FIG. 10, multicast data (DATA) stored in the contents management server 201 is delivered to the base stations 203 that perform a multicast transmission via the MBMS-GW 202, similarly to the first embodiment of FIG. 2.

In FIG. 10, the MBMS-GW 200 delivers the received multicast data to the base stations 203 unchanged unlike the first embodiment of FIG. 2. At this time, the MBMS-GW 202 respectively reports, to the base stations 203, with which wireless frame each piece of data is transmitted.

In FIG. 10, in the base stations 203, the MD coder 1001 MD-codes the multicast data received from the MBMS-GW 202 unlike the first embodiment of FIG. 2. Then, the base stations 203 respectively decide frequencies for multicast-transmitting the respective pieces of MD code data using the transmission frequency setting unit 203-1, similarly to the first embodiment of FIG. 2, and simultaneously multicast-transmit the respective pieces of MD code data which are MD-coded by the MD coder 1001 respectively at the decided frequencies.

In the third embodiment, a multicast service rendered at the time of a handover may be continued, and a service of higher quality may be rendered to an LTE-A terminal that may simultaneously receive the service in a plurality of frequency bands, similarly to the first embodiment.

Furthermore, in the third embodiment, the configuration of the MBMS-GW 202 is simplified.

Details of the operations of the above described third embodiment implemented as the example of FIG. 10 are described below.

An initial setting process executed between the MBMS-GW 202 and the base stations 203 in a multicast transmission is described with reference to an operational sequence (No. 1) of the third embodiment illustrated in FIG. 11.

In the third embodiment, the MBMS-GW 202 only assigns transmission timing for the base stations 203 to the multicast data obtained from the contents management server 201, and transfers the multicast data to the base stations 203.

The base stations 203 respectively decide the number of outputs of MD-coded data in advance based on the number of carriers that may perform a multicast transmission (step S1101 of FIG. 11).

Next, the base stations 203 respectively set the number (n) of multicast transmission carriers (step S1102 of FIG. 11). The base stations 203 respectively set an initial number of carriers to 1 if the number of carriers is changed according to the number of accommodated terminals and quality requested by a terminal, similarly to the other embodiments. Alternatively, the base stations 203 respectively set the number of carriers to a maximum number if the number of carriers is fixed.

Then, the base stations 203 arbitrarily select frequencies for performing a multicast transmission (step S1103 of FIG. 11).

In the third embodiment, the following operations are performed if a data delivery is performed by establishing a multicast service connection between the terminal 204 or 205 and the network.

Namely, in the base stations 203 that have received the multicast data from the MBMS-GW 202, the MD coder 1001 MD-codes the received data to generate the coded data by a preset number of outputs, and sets and transmits the MD code data for frequencies preset by each transmission frequency setting unit 203-1 (step S1104 of FIG. 11).

Operations performed when a frequency for performing a multicast transmission is allowed to be changed according to an increase/decrease in the number of accommodated terminals, or service quality requested by an LTE-A terminal are described with reference to an operational sequence (No. 2) of the third embodiment illustrated in FIG. 12.

Each of the base stations 203 determines an increase/decrease in the number of carriers at the timing of a handover request or a handover completion notification received from another base station 203, or at the timing of a service connection/disconnection/change request or the like issued from an accommodated terminal 204 or 205 (steps S1201, S1202 and S1203 of FIG. 12). Namely, each of the base stations 203 determines the increase/decrease in the number of carriers when the number of accommodated terminals 204 and 205 or the requested quality is changed.

The base station 203 counts the number of terminals connected to a multicast service according to the event (step S1204 of FIG. 12). This operation is similar to that of step S403 illustrated in FIG. 4A, which is performed by the MBMS-GW 202 in the first embodiment.

The base station 203 determines the number of multicast transmission carriers according to the counted number of connected terminals, and the requested quality (step S1205 of FIG. 12). This operation is similar to that of step S404 illustrated in FIG. 4A, which is performed by the MBMS-GW 202 in the first embodiment.

The base station 203 determines whether or not the above described determined number of carriers is changed from the currently set number (step S1206 of FIG. 12).

If the determined number of carriers is not changed from the currently set number as a result of this determination, the base station 203 waits to receive an event that is regarded as the next timing to increase/decrease the number of carriers.

Alternatively, if the determined number of carriers is changed from the currently set number, the base station 203 changes the number of pieces of MD code data (step S1207 of FIG. 12). This operation is similar to that of step S406 illustrated in FIG. 4B, which is performed by the MBMS-GW 202 in the first embodiment.

The base station 203 changes the physical channel setting according to the number of pieces of transmission data (step S1208 of FIG. 12). As a result, the base station 203 notifies the LTE-A terminal 205 that is already receiving the multicast service of the change of the setting information and the physical channel information (the number of transmission carriers) (step S1209 of FIG. 12). These operations are similar to those of steps S408 and S409 of FIG. 4B, which are performed by the base stations 203 in the first embodiment.

The LTE-A terminal 205 that has received the change notification of the setting information sets an increase/decrease of a reception carrier as needed (step S1210 of FIG. 12). This operation is similar to that of step S410 illustrated in FIG. 4B, which is performed by the terminal 205 in the first embodiment.

FIG. 13 illustrates an example of a system configuration of a fourth embodiment. The fourth embodiment represents a network configuration where base stations MD-code multicast data and an MBSFN environment is configured.

In the system configuration of FIG. 13, a contents management server, an MBMS-GW, base stations and terminals are denoted with the same reference numerals as those of the system configuration of the first embodiment illustrated in FIG. 2.

In FIG. 13, multicast data (DATA) stored in the contents management server 201 is delivered, via the MBMS-GW 202, to the base stations 203 that perform a multicast transmission.

In FIG. 13, the MBMS-GW 200 delivers the received multicast data to the base stations 203 unchanged. At this time, the MBMS-GW 202 respectively reports, to the base stations 203, which wireless frame each piece of data is transmitted with.

In FIG. 13, the base stations 203 that configure the MBSFN include one base station 203 (#1 in FIG. 13) that operates as Master, and one or more base stations 203 (#2 in FIG. 13) that operate as Slave. The Master base station 203 and the Slave base station 203 are hereinafter referred to as the base station 203 (Master) and the base station 203 (Slave), respectively. The base station 203 (Master) includes an MD coding controlling unit 1301, which may be realized by a processor (e.g., DSP, CPU), configured to decide the number of pieces of MD-coded data of multicast data, and common frequencies at which the base stations 203 transmit the same coded data with the same frequencies. The base station 203 (Master) respectively notifies the base stations 203 (Slave) of the MD coding information and the transmission frequency setting information, which are decided by the MD coding controlling unit 1301, before a multicast service is started.

In the base stations 203 (Slave) that have received the multicast data, an MD coder 1001 similar to that of the third embodiment illustrated in FIG. 10 MD-codes the received data, and multicast-transmit the MD-coded data as instructed by the base station 203 (Master). FIG. 13 illustrates an example where the data is MD-coded in two frequency bands. Namely, this is the example where DATA_MD #0 and DATA_MD #1 are generated from DATA, and DATA_MD #0 and DATA_MD #1 are respectively set to the frequency Freq #0 and the frequency Freq #1.

As a result, the same data are transmitted among the base stations 203 at the same frequencies, so that an MBSFN environment may be configured.

Similarly to the first embodiment, a multicast service at the time of a handover may be continued, and a service of higher quality may be rendered to an LTE-A terminal that may simultaneously receive data in a plurality of frequency bands in the fourth embodiment.

Furthermore, in the fourth embodiment, the configuration of the MBMS-GW 202 may be simplified, and at the same time, operations of the entire may be controlled by the MD coding controlling unit 1301 within the Master base station 203.

Further details of the operations of the above described fourth embodiment implemented as the example of FIG. 13 are described below.

Initially, an initial setting process executed between the MBMS-GW 202 and the base stations 203 in a multicast transmission is described with reference to an operational sequence (No. 1) of the fourth embodiment illustrated in FIGS. 14A and 14B.

Similarly to the above described third embodiment, the MBMS-GW 202 only assigns transmission timing to the base stations 201 to multicast data obtained from the contents management server 201, and transfers the multicast data in the fourth embodiment.

The base station 203 (Master) obtains, from the base stations 203 (Slave), information such as frequencies that may perform a multicast transmission, their physical channel information and the like (step S1401 of FIG. 14A). This information includes at least the number of carriers that may perform a multicast transmission, and frequencies of the carriers. The fourth embodiment assumes to configure MBSFN. Therefore, the information respectively transmitted from the base stations 203 include at least a common frequency of one carrier. A base station 203 that does not have the common frequency is excluded from MBSFN targets. For the common frequency, its frequency information is held as a carrier list.

The base station 203 (Master) determines the number of common carriers as the number (m) of outputs of MD code data based on the information collected from the base stations 203 (Slave) (step S1402 of FIG. 14A).

Next, the base station 203 (Master) sets the number (n) of transmission carriers to be multicast to the base stations 203 (Slave) (step S1403 of FIG. 14A).

Additionally, the base station 203 (Master) decides common frequencies used for a multicast transmission in all of the base stations 203 (step S1404 of FIG. 14A).

Then, the base station 203 (Master) respectively notifies the base stations 203 (Slave) of MD-code information, such as the number (n) of multicast transmission carriers, an MD coding method for obtaining the same output results, multicast transmission frequency, frequencies of respective pieces of MD code data, and the like (step S1405 of FIG. 14A). Since MBSFN is configured in the fourth embodiment, all of values reported to the base stations 203 (Slave) are the same. If the number of transmission carriers is not changed with an increase/decrease of a terminal 204 or 205, the base station 203 (Master) notifies the base stations 203 (Slave) of the maximum number of carriers that may perform a transmission. If the number of transmission carriers is changed with an increase/decrease of a terminal 204 or 205, the base station 203 (Master) sets a minimum value (1 carrier) respectively in the base stations 203 (Slave) as an initial setting.

Next, the following operations are performed when a data delivery is performed by establishing a multicast service connection between the terminal 204 or 205 and the network in the fourth embodiment.

The MBMS-GW 202 that has received the multicast data delivered from the contents management server 201 transfers the received multicast data along with its timing information Frame_Timing to the base stations 203.

The base stations 203 that have received the multicast data delivered from the MBMS-GW 202 MD-codes the multicast data to obtain the coded data (step S1406 of FIG. 14B).

The base stations 203 respectively select a predetermined piece of the MD-coded data, and sets a predetermined transmission frequency (step S1407 of FIG. 14B).

Then, the base stations 203 respectively multicast-transmit the data at timing specified by the MBMS-GW 202 (step S1408 of FIG. 14B).

The LTE-A terminal 250 that may simultaneously receive a plurality of frequencies combines and reconfigures the MD code data received at the same timing, and uses the multicast data. The number of pieces of MD code data that may be combined, delivery frequencies and the like are notified from a corresponding base station 203 when a service connection is established.

Next, operations performed when a multicast transmission frequency is allowed to be changed according to an increase/decrease in the number of accommodated terminals, and service quality requested by the LTE-A terminal in the fourth embodiment are described with reference to an operational sequence (No. 2) of the fourth embodiment illustrated in FIGS. 15A and 15B.

Figure 15A:
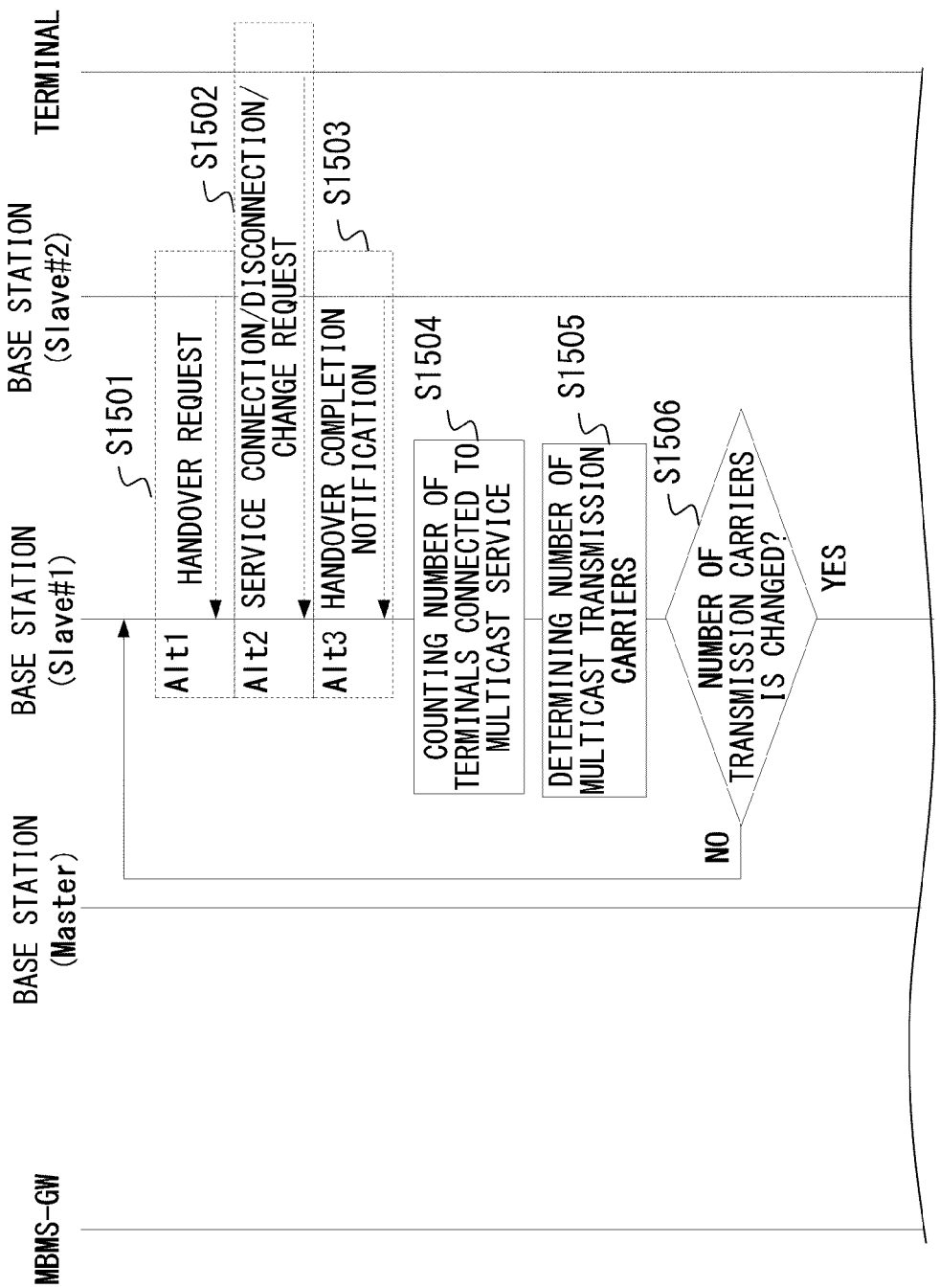
FIGS. 15A and 15B illustrate an operational sequence (No. 2) of the fourth embodiment.

The base stations 203 (including Slave and Master) respectively determine an increase/decrease in the number of carriers at the timing of a Handover request or a Handover completion notification received from another base station 203, or at the timing of a service connection/disconnection/change request or the like made from an accommodated terminal 204 or 205 (steps S1501, S1502 and S1503 of FIG. 15A). Namely, the base stations 203 (including Slave and Master) respectively determine an increase/decrease in the number of carriers when the number of accommodated terminals 204, 205 or requested quality is changed.

The base station 203 counts the number of terminals connected to a multicast service according to the event (step S1504 of FIG. 15A). This operation is similar to that of step S403 illustrated in FIG. 4A, which is performed by the MBMS-GW 202 in the first embodiment.

The base station 203 determines the number of multicast transmission carriers based on the counted number of connected terminals and the requested quality (step S1505 of FIG. 15A). This operation is similar to that of step S404 illustrated in FIG. 4A, which is performed by the MBMS-GW 202 in the first embodiment.

The base station 203 determines whether or not the above determined number of carriers is changed from the currently set number (step S1506 of FIG. 15A).

If the determined number of carriers is not changed from the currently set number as a result of this determination, the base station 203 waits to receive an event that is regarded as the next timing of an increase/decrease in the number of carriers.

In contrast, if the determined number of carriers is changed from the currently set number, the base station 203 transmits a transmission carrier number change request to the base station 203 (Master) (step S1507 of FIG. 15A).

Figure 15B:
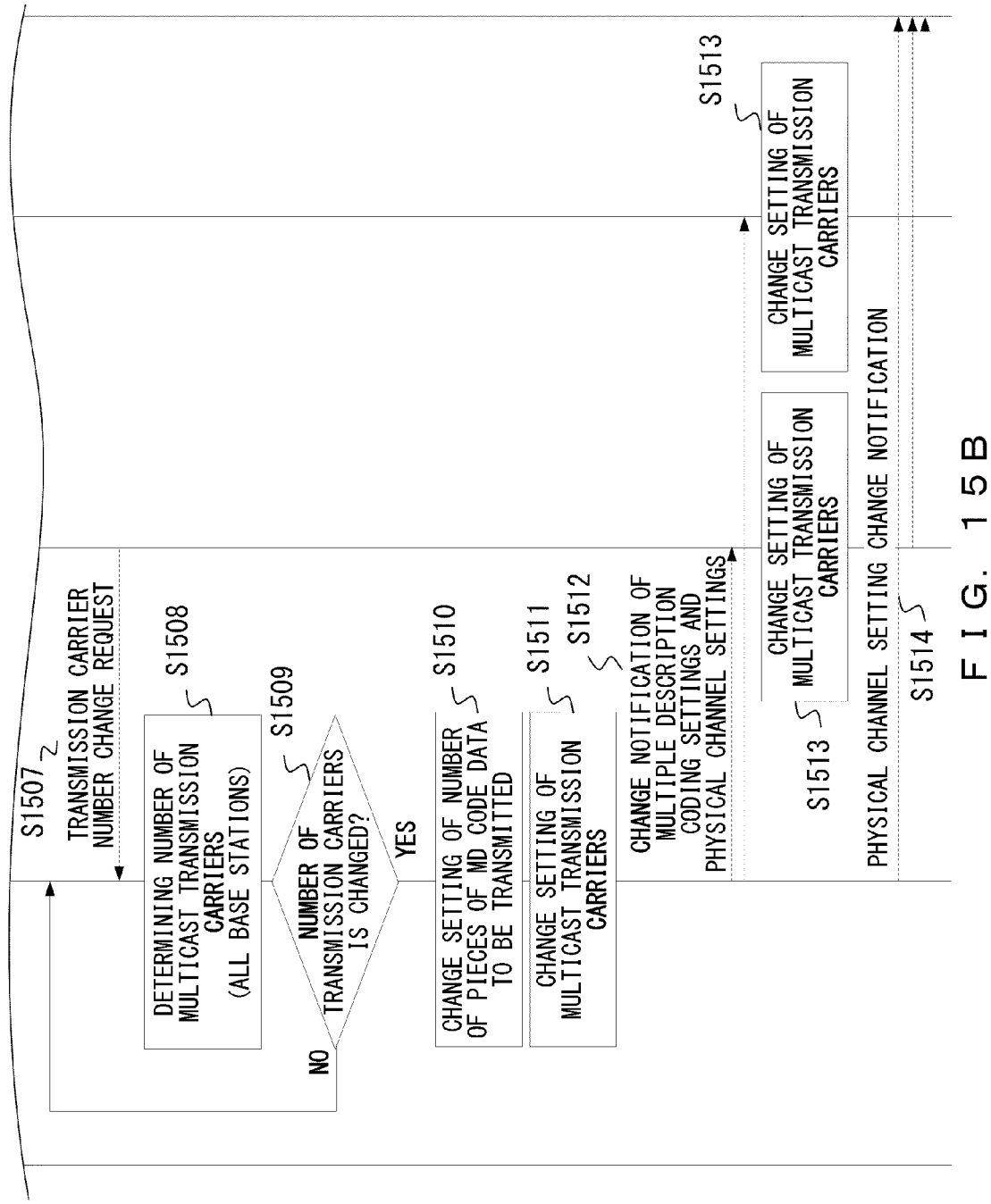

The base station 203 (Master) that has received the transmission carrier number change request determines whether or not to change the number of transmission carriers in consideration of states of all the base stations 203 (including Slave and Master) (step S1508 of FIG. 15B). Examples of the determination include a determination of leaving the current number unchanged since the number of carriers may not be decreased in the other base stations 203 if a request to remove a carrier is made, and a determination of increasing the number of carriers in order to secure the number of accommodated terminals if an increase request is made.

The base station 203 (Master) waits to receive another transmission carrier number change request without executing the transmission carrier number change process if determining not to change the number of transmission carriers (step S1509 back to S1507 of FIGS. 15A and 15B).

If determining to change the number of transmission carriers, the base station 203 (Master) sets the number of pieces of MD-coded data to be transmitted according to the number of transmission carriers, and coded data to be transmitted, frequencies for transmitting the coded data, and the like (step S1510 of FIG. 15B). This operation is similar to that of step S406 illustrated in FIG. 4B, which is performed by the MBMS-GW 202 in the first embodiment.

Thereafter, the base station 203 (Master) changes physical channel settings such as a change setting of the number of multicast transmission carriers of the local station based on the setting information (step S1511 of FIG. 15B). This operation is similar to that of step S408 illustrated in FIG. 4B, which is performed by the base station 203 in the first embodiment.

Then, the base station 203 (Master) notifies all the base stations 203 (Slave) of the information set in step S1510 (step S1512 of FIG. 15B).

The base stations 203 (Slave) change the physical channel settings such as the setting change of the number of multicast transmission carriers of itself based on the setting information notified from the base station 203 (Master) in step S1512 (step S1513 of FIG. 15B). This operation is similar to that of step S408 of FIG. 4B, which is performed by the base station 203 in the first embodiment.

As a result of the above described steps S1511 and S1513, the base stations 203 (including Slave and Master) notify the LTE-A terminal 205 that is already receiving a multicast service of the change of the setting information and the physical channel information (the number of transmission carriers) (step S1514 of FIG. 15B). This operation is similar to that of step S409 illustrated in FIG. 4B, which is performed by the base stations 203 in the first embodiment.

The LTE-A terminal 205 that has received the change notification of the setting information sets an increase/decrease of a reception carrier as needed (step S1210 of FIG. 12). This operation is similar to that of step S410 illustrated in FIG. 4B, which is performed by the terminal 205 in the first embodiment.

FIG. 16 illustrates an example of a system configuration of a fifth embodiment. The fifth embodiment represents an implementation example of a mobile terminal that receives MD-coded multicast data.

The mobile terminal that has received a wireless signal transmitted from a base station with an antenna 1601 executes a demodulation/decoding process in a wireless unit modulating/decoding unit 1602 (or a receiver 1602), and obtains MD code data before being coded/modulated.

The mobile terminal that may simultaneously receive the data in a plurality of frequency bands executes the demodulation/decoding process respectively for the frequency bands.

The obtained MD code data is stored in Buffer 1603.

A reception quality measuring unit 1605, which may be realized by a processor (e.g., DSP, CPU), continuously measures an MD-code data obtainment error rate in the wireless unit demodulating/decoding unit 1602, and notifies an MD decoding controller 1606 of a result of the measurement.

The MD decoding controller 1606 decides the number of pieces of MD code data decoded by an MD decoder 1604 based on a predetermined threshold value in order to prevent a quality change caused by a reception error as much as possible. Assuming that 2.2 MD codes are obtained on average as a result of the reception quality measurement when multicast data is received in three frequency bands, the quality significantly fluctuates to increase a change if the data is decoded with three MD codes, two codes or one MD code. In such a case, two pieces of MD code data are set to be input to the MD decoder 1604. Moreover, assuming that 2.9 MD codes are obtained on average as a result of the reception quality measurement, the multicast data may be decoded with three pieces of MD-coded data in many cases. Therefore, the MD decoder 1604 is set to decode the multicast data with the three MD codes. If the threshold value is 2.7, the number of inputs of MD codes is decided as described above.

If the number of pieces of received data does not satisfy a preset number as the result of the reception quality measurement when an error occurs, a correction process is executed.

The MD decoder 1604 obtains MD code data from the buffer by the number of codes, which is set by the MD decoding controller 1606, and executes the MD decoding process for the data.

FIG. 17 illustrates a first specific example of MD coding performed in the above described first to fifth embodiments.

In this example, for instance, four types of MD-coded image data 1702 are generated from image data having a VGA resolution (640×480 pixels) by reducing the VGA resolution to a QVGA resolution (320×240 pixels).

Then, the respective pieces of image data 1702 are transmitted to LTE terminals or an LTE-A terminal by using four MBMS channels each having a 20-MHz frequency band as indicated by 1703 of FIG. 17.

The LTE terminals may receive image data 1705 having the QVGA resolution from any of the MBMS channels. Even if the reception frequency is switched when a handover occurs in the LTE terminals, image data 1705 of the same source, which is transmitted at another frequency, is received, so that the multicast service may be continued.

In the meantime, the LTE-A terminal may reconfigure the original image data 1706 having the VGA resolution from the MD-code data received at a plurality of frequencies.

Figure 18:
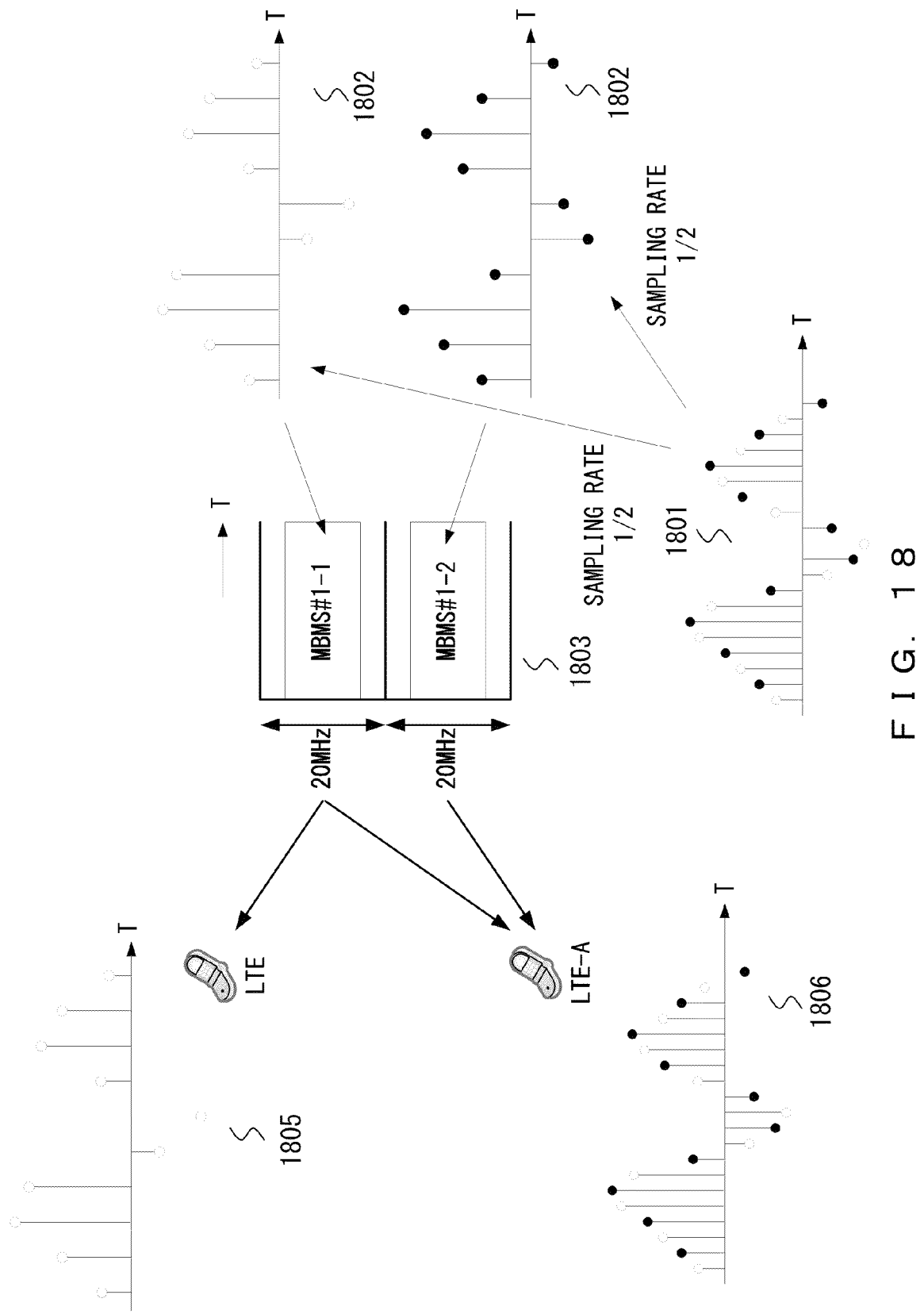
FIG. 18 illustrates a second specific example of MD coding.

FIG. 18 illustrates a second specific example of MD coding in the above described first to fifth embodiments.

In this example, for instance, two types of MD-coded audio data 1802 having a sampling rate of ½ (a sampling interval is twice) are generated from audio data.

Then, the respective pieces of audio data 1802 are transmitted to an LTE terminal or an LTE-A terminal by using two MBMS channels each having a 20-MHz frequency band as indicated by 1803 of FIG. 18.

The LTE terminal may receive the audio data 1805 having the sampling rate of ½ (the sampling interval is twice) from any one of the MBMS channels. Even if the reception frequency is switched when a handover occurs in the LTE terminal, the LTE terminal may receive audio data 1805 of the same source transmitted at another frequency, so that the multicast service may be continued.

In contrast, the LTE-A terminal may reconfigure audio data 1806 having the original sampling rate from the MD code data received at a plurality of frequencies.

Lastly, advantages of a handover implemented with a plurality of specified frequencies to detect a destination base station in the above described first to the fourth embodiments are described.

When a base station at a handover destination performs a multicast transmission with a plurality of carriers, a handover processing time may be reduced with the above described control method according to the first to the fourth embodiments.

Figure 19A:
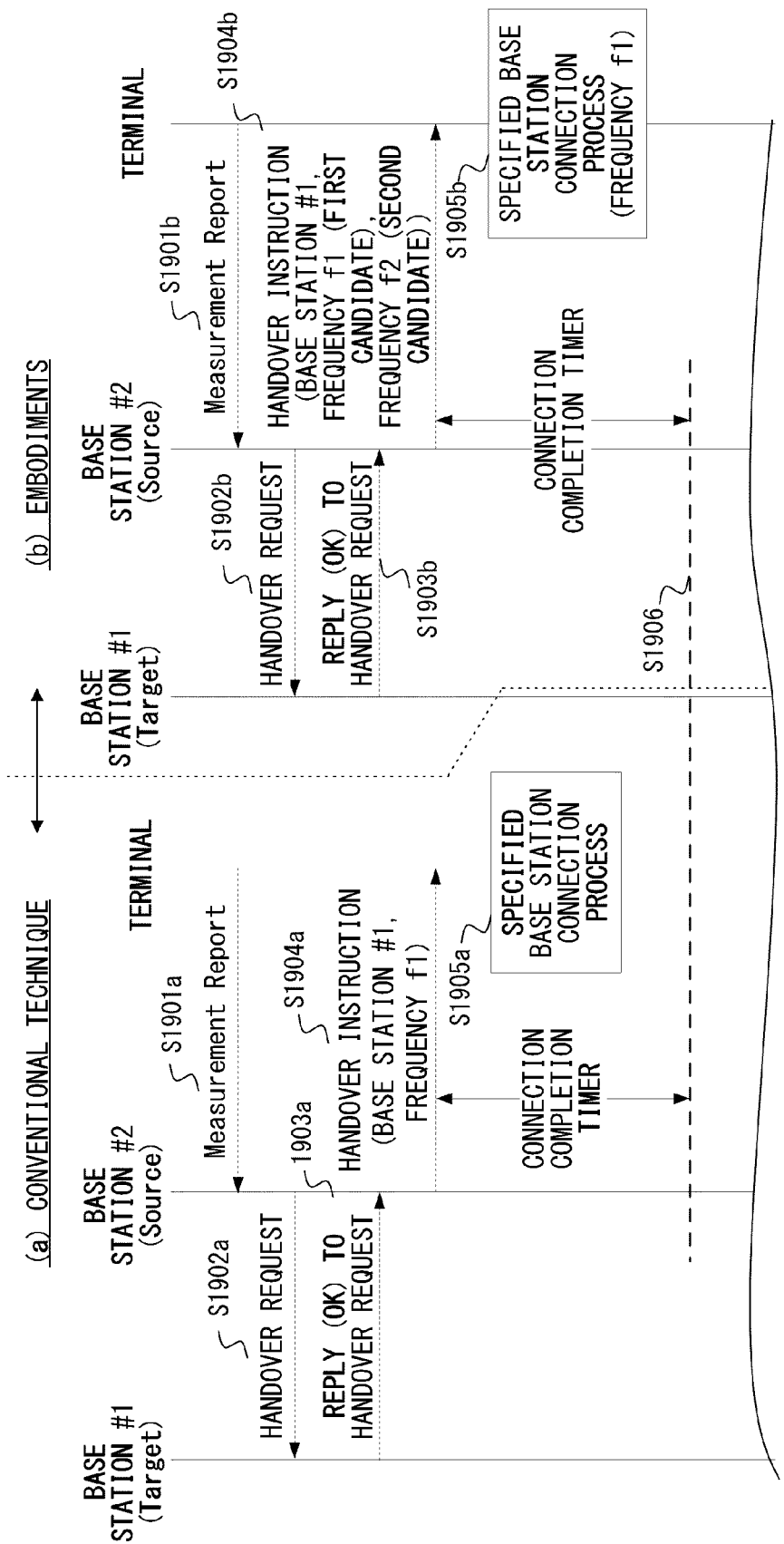
FIGS. 19A and 19B are an explanatory view of a comparison between a handover process of a conventional technique and that of embodiments.
Figure 19B:
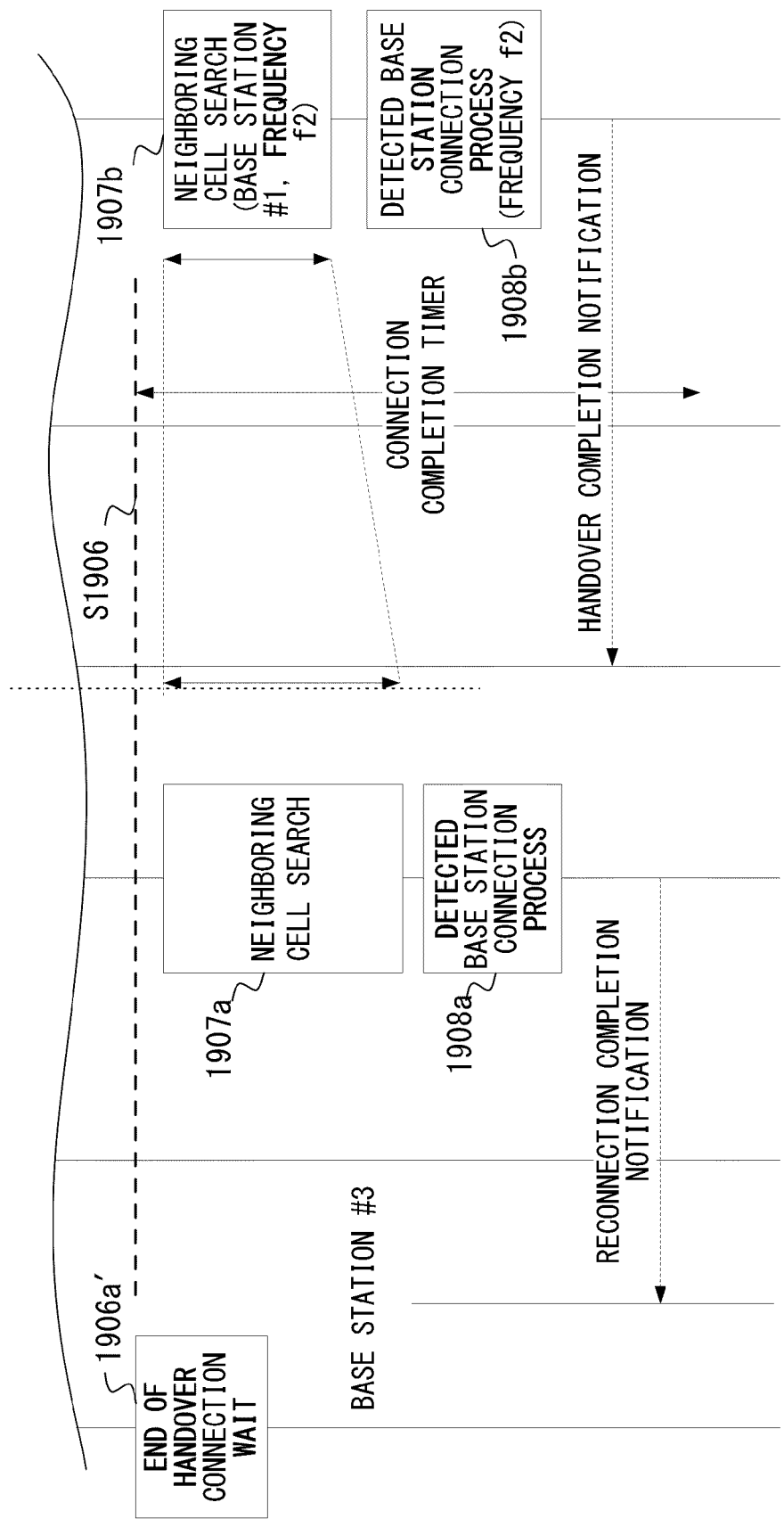

In a handover, procedures illustrated in FIGS. 19A and 19B are executed with a conventional technique and the first to the fourth embodiments. In the following description, a procedure having a step number with a suffix "a" indicates a procedure of the conventional technique, whereas a procedure having a step number with a suffix "b" indicates a procedure common to the first to the fourth embodiments.

Step S1901a/S1901b

Reporting Measurement Report (neighboring cell measurement results) from a terminal that performs a handover to the base station #2 at the handover source (Source).

Step S1902a/S1902b

Transmitting a Handover request from the Source base station #2 to the base station #1 as the handover destination maydidate (Target).

Step S1903a/S1903b

Returning an OK reply to the Handover request from the Target base station #1 to the Source base station #2.

Step S1904a/S1904b

Transmitting a Handover instruction from the Source base station #2 to the terminal.

In the conventional technique, only one base station #1 as a handover destination candidate, and only one carrier frequency candidate f1 may be specified in the Handover instruction (step S1904a).

In contrast, although the first to the fourth embodiments are the same as the conventional techniques in a point that the Handover instruction includes only the specification of one base station #1 as a handover destination candidate, a plurality of carrier frequency candidates f1, f2 that perform a transmission with MBMS may be specified if the Target base station #1 performs a transmission with MBMS (step S1904b). This control is performed with the processes such as the handover instruction process used as a trigger of step 508 of the first embodiment illustrated in FIG. 5, step S508 of the second embodiment illustrated in FIG. 9, step S1203 of the third embodiment illustrated in FIG. 12, or step S1503 of the fourth embodiment illustrated in FIG. 15A. As the carrier frequency candidate, a frequency notified from a base station at a handover destination in step S1903b is specified, or a frequency at which the base station performs a multicast transmission is specified if MBSFN is configured.

Step S1905a/S1905b

A process for connecting to the specified base station #1.

In the conventional techniques and the first to the fourth embodiments, a connection to the specified frequency f1 of the specified base station #1 is attempted based on the Handover instruction issued from the Source base station #2 in a time period specified by a connection completion Timer. Note that a connection to the frequency f1 specified as a first candidate within the Handover instruction is attempted in the first to the fourth embodiments. With the conventional technique, only one frequency f1 is specified in the Handover instruction.

Step S1906a/S1906b

Expiration of the Connection Completion Timer

With the conventional technique, a handover connection wait state in the Target base station #1 is ended with this expiration (step S1906a').

In the first to the fifth embodiments, the Target base station #1 waits for a reply for a plurality of carrier frequencies without ending the state of waiting for a handover connection even after the connection completion Timer expires if the Handover instruction includes the plurality of carrier frequency candidates.

Step S1907a/S1907b

Step S1908a/S1908b

A terminal that performs a handover reenters a state of searching for a neighboring cell after the connection completion Timer expires. If a neighboring cell is successfully searched, a process for connecting to the detected base station is executed.

With the conventional technique, a base station search needs to be again performed. Accordingly, the process searching for a neighboring cell needs a lot of time. Moreover, a reconnection destination is sometimes different from a base station originally specified as a handover destination, and a carrier frequency of the destination. Therefore, the possibility of an unsuccessful handover is high.

Since the Target base station #1 is specified as a neighboring cell to be searched in the first to the fourth embodiments, a terminal knows which base station to be detected. Moreover, since also the carrier frequency candidate f2 is specified, the terminal also knows at which carrier frequency a handover is to be performed. Accordingly, the neighboring cell search may be terminated in a short time, and the possibility of enabling a connection to the originally planned Target base station #1 increases. As a result, the processing time may be reduced, and a success rate of the handover may be improved.

As described above, the first to the fifth embodiments may provide a multicast system where a mobile terminal, such as an LTE terminal, which may receive only one frequency band, may continue a multicast service regardless of a reception frequency of a base station at a handover destination at the time of a handover.

Additionally, in the first to the fifth embodiments, the mobile terminal, such as an LTE-A terminal, which may simultaneously receive a multicast service in a plurality of frequency bands, may receive a service of higher quality than that of an LTE terminal by combining MD-code data, whereby a system with high frequency use efficiency may be implemented with the quality improving method.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention have been described in detail, it should be understood that the various changes, substitutions, and alterations could be made hereto without departing from the spirit and scope of the invention.

What is claimed is:

1. A multicast data wireless communication method for transmitting multicast data by using a plurality of frequency bands, comprising:
    coding the multicast data by partitioning the multicast data into a plurality of pieces of multiple description code data;
    setting a plurality of transmission carrier frequencies at which a plurality of base stations respectively transmit the plurality of pieces of multiple description code data;
    transmitting, respectively by the plurality of base stations, to concurrently transmit the plurality of pieces of multiple description code data by using the set plurality of transmission carrier frequencies; and
    receiving, by a terminal, any one or more of the plurality of pieces of multiple description code data transmitted from one of the plurality of base stations by using the plurality of transmission carrier frequencies, and to decoding the multicast data from the received multiple description code data.

2. The multicast data communication method according to claim 1, wherein
    setting the plurality of transmission carrier frequencies is executed by each of the plurality of base stations, and each of the plurality of base stations arbitrarily sets the plurality of transmission carrier frequencies for transmitting the plurality of pieces of multiple description code data.

3. The multicast data communication method according to claim 1, wherein
    coding the multicast data is executed by a gateway device that delivers the multicast data from a contents management server managing the multicast data to the plurality of base stations, and the gateway device delivers the plurality of pieces of multiple description code data to the plurality of base stations.

4. The multicast data communication method according to claim 2, wherein
    coding the multicast data is executed by each of the plurality of base stations.

5. The multicast data communication method according to claim 1, wherein
    setting the plurality of transmission carrier frequencies is executed by a gateway device that delivers the multicast data from a contents management server managing the multicast data to the plurality of base stations, and the gateway device integrally sets the plurality of transmission carrier frequencies for transmitting the plurality of multiple description code data from the plurality of base stations, and notifies the plurality of base stations of the plurality of set transmission carrier frequencies,
    coding the multicast data is executed by the gateway device, and the gateway device delivers the plurality of pieces of multiple description code data to the plurality of base stations, and
    the plurality of base stations respectively set, in themselves, the plurality of transmission carrier frequencies notified from the gateway device, and transmit the plurality of pieces of multiple description code data delivered from the gateway device by using the plurality of set transmission carrier frequencies.

6. The multicast data communication method according to claim 1, wherein
    setting the plurality of transmission carrier frequencies is executed by a base station specified among the plurality of base stations, and the specified base station integrally sets the plurality of transmission carrier frequencies for transmitting the plurality of pieces of multiple description code data from the plurality of base stations, and notifies the plurality of base stations of the plurality of set transmission carrier frequencies, and
    the plurality of base stations respectively set, in themselves, the plurality of transmission carriers frequencies notified from the specified base station, and transmit the plurality of pieces of multiple description code data by using the plurality of set transmission carrier frequencies.

7. A multicast data wireless communication system for transmitting multicast data by using a plurality of frequency bands, comprising:
    a gateway device configured to deliver the multicast data from a contents management server that manages the multicast data to a plurality of base stations, to include a multiple description coder that performs coding of the multicast data by partitioning the multicast data into a plurality of pieces of multiple description code data, and to deliver the plurality of multiple description code data to the plurality of base stations;
    a plurality of base stations each including a processor configured to arbitrarily set a plurality of transmission carrier frequencies for transmitting the plurality of pieces of multiple description code data, and each configured to concurrently transmit the plurality of pieces of multiple description code data delivered from the gateway device by using the plurality of transmission carrier frequencies set by the processor; and
    a terminal configured to receive, from one of the plurality of base stations, any one or more of the plurality of pieces of multiple description code data transmitted by using the plurality of transmission carrier frequencies, and to reproduce the multicast data by decoding the received multiple description code data.

8. A terminal for receiving multicast data transmitted by using a plurality of frequency bands, comprising:

a receiver configured to simultaneously receive a plurality of transmission signals transmitted from a base station by using a plurality of transmission carrier frequencies, and to extract a plurality of pieces of multiple description code data from the plurality of transmission signals;

a controller configured to decide a number of pieces of the multiple description code data used for decoding based on an error rate of the plurality of pieces of multiple description code data extracted by the receiver; and a multiple description decoder configured to select the multiple description code data by the number of pieces, which is decided by the controller, among the plurality of pieces of multiple description code data extracted by the receiver, and to decode the multicast data based on the selected multiple description code data.

* * * * *